US009755853B2

(12) United States Patent
Berman

(10) Patent No.: US 9,755,853 B2
(45) Date of Patent: *Sep. 5, 2017

(54) METHODS, SYSTEMS AND APPARATUS FOR THE CONTROL OF INTERCONNECTION OF FIBRE CHANNEL OVER ETHERNET DEVICES

(71) Applicant: JEDA NETWORKS, INC., Newport Beach, CA (US)

(72) Inventor: Stuart B. Berman, Newport Coast, CA (US)

(73) Assignee: JEDA NETWORKS, INC., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,573

(22) Filed: Oct. 30, 2015

(65) Prior Publication Data

US 2016/0248599 A1 Aug. 25, 2016

Related U.S. Application Data

(63) Continuation of application No. 13/547,848, filed on Jul. 12, 2012, now Pat. No. 9,178,944, which is a continuation-in-part of application No. 12/987,057, filed on Jan. 7, 2011, now Pat. No. 8,625,597, and a continuation-in-part of application No. 12/987,063, filed on Jan. 7, 2011, now Pat. No. 8,811,399, and a continuation-in-part of application No. 12/987,066,
(Continued)

(51) Int. Cl.
*H04L 12/46* (2006.01)
*H04L 12/24* (2006.01)
*H04L 12/66* (2006.01)
*H04L 12/931* (2013.01)
*H04L 29/08* (2006.01)

(52) U.S. Cl.
CPC ...... *H04L 12/4604* (2013.01); *H04L 12/4625* (2013.01); *H04L 12/4641* (2013.01); *H04L 12/66* (2013.01); *H04L 41/12* (2013.01); *H04L 49/70* (2013.01); *H04L 67/1097* (2013.01)

(58) Field of Classification Search
CPC ........ H04L 69/30–69/329; H04L 69/03; H04L 67/10–67/1097; H04L 61/20; H04L 49/70; H04L 41/12; H04L 12/46–12/4695; G06F 16/16–16/177; G06F 8/10
See application file for complete search history.

(56) References Cited

U.S. PATENT DOCUMENTS 8,929,368 B2 * 1/2015 Zhang ................. H04L 12/4641
370/389
9,178,944 B2 * 11/2015 Berman .............. H04L 12/4625

* cited by examiner

*Primary Examiner* — Timothy J Weidner
(74) *Attorney, Agent, or Firm* — David B. Murphy; O'Melveny & Myers LLP

(57) ABSTRACT

Systems, apparatus and methods are provided for interconnection of one or more Fibre Channel over Ethernet (FCoE) devices. The system preferably comprises a virtualized or virtual server which in turn comprises a virtual machine having an FCoE device interconnection apparatus controller, a virtual switch, the virtual switch being coupled to the FCoE device interconnection apparatus controller, and a network interface. The network interface is coupled to the virtual switch, which in turn couples to an Ethernet fabric. A first Ethernet link couples the network interface to the Ethernet fabric. One or more Fibre Channel over Ethernet (FCoE) devices are coupled to the Ethernet fabric via Ethernet links.

20 Claims, 31 Drawing Sheets

Related U.S. Application Data filed on Jan. 7, 2011, now Pat. No. 8,559,433, and a continuation-in-part of application No. 12/987,073, filed on Jan. 7, 2011, now Pat. No. 9,106,579, and a continuation-in-part of application No. 12/987,077, filed on Jan. 7, 2011, now Pat. No. 9,071,630, and a continuation-in-part of application No. 12/987,076, filed on Jan. 7, 2011, now Pat. No. 8,559,335, and a continuation-in-part of application No. 12/987,075, filed on Jan. 7, 2011, now Pat. No. 9,071,629.

FIA FME Table 230

Entry # 1 231
1170 Ingress Ports 3
1171 Ethernet Type == FCoE Type
1176 Vlan == 100, PCP == 3
1172 DA_MAC == FCF_MAC
1173 SA_MAC == T1_MAC
1174 D_ID == I1_FCID
1175 S_ID == T1_FCID
Action:
1177 Insert DA_MAC == I1_MAC
1178 Insert SA_MAC == FCF_MAC
1179 Redirect to Port 1

Entry # 2 232
1180 Ingress Ports 3
1181 Ethernet Type == FCoE Type
1186 Vlan == 100, PCP == 3
1182 DA_MAC == FCF_MAC
1183 SA_MAC == T1_MAC
1184 D_ID == I2_FCID
1185 S_ID == T1_FCID
Action:
1187 Insert DA_MAC == I2_MAC
1188 Insert SA_MAC == FCF_MAC
1189 Redirect to Port 2

Entry # 3 233
1190 Ingress Ports 1
1191 Ethernet Type == FCoE Type
1196 Vlan == 100, PCP == 3
1192 DA_MAC == FCF_MAC
1193 SA_MAC == I1_MAC
1194 D_ID == T1_FCID
1195 S_ID == I1_FCID
Action:
1197 Insert DA_MAC == T1_MAC
1198 Insert SA_MAC == FCF_MAC
1199 Redirect to Port 3

Entry # 4 234
200 Ingress Ports 2
201 Ethernet Type == FCoE Type
206 Vlan == 100, PCP == 3
202 DA_MAC == FCF_MAC
203 SA_MAC == I2_MAC
204 D_ID == T1_FCID
205 S_ID == I2_FCID
Action:
207 Insert DA_MAC == T1_MAC
208 Insert SA_MAC == FCF_MAC
209 Redirect to Port 3

Entry # 5 235
210 Ingress Ports 1, 2, 3
211 Ethernet Type == FIP Type
214 Vlan == 100, PCP == 3
212 DA_MAC == FCF_MAC
213 SA_MAC == Any
Action:
215 Redirect to Port 4

Entry # 6 236
216 Ingress Ports 1, 2, 3
221 Vlan == 100, PCP == 3
217 Ethernet Type == FCoE Type
218 DA_MAC == FCF_MAC
219 SA_MAC == Any
220 D_ID == FF:FF
Action:
222 Redirect to Port 4

FIA FME Table 240

241 Entry #7
242 Ingress Ports 1, 2, 3, 4
243 Ethernet Type == FCoE Type
244 Vlan == 100, PCP == 3
Action:
245 Deny

Get N PortId's in Zone 250

251 Get_portids_in_zone(Vlan, FCID) ->
  252 Wwpn = find_wwpn(Vlan, FCID),
  253 for each zone that the wwpn is in:
    254 create a list of zone names
  255 for each zone name in the list, create another list of zone members
  256 FCID_list = for each zone member in the new list, return the FCID's excluding the passed FCID
  257 if zone of passed (Vlan, FCID) is not the default zone
    258 return the FCID_list
  259 else % passed (Vlan, FCID) is in the default zone
    260 case default zone state of
      261 DENY -> return null list of FCID's
      262 PERMIT -> return the FCID_list
      263 AUTOZONE ->
        264 Target_list = get_target_fcids(Vlan, FCID_list)
        265 case Type of
          266 INITIATOR -> Initiator_list = subtract_lists(FCID_list, Target_list, FCID_list),
            267 Return the Initiator_list;
          268 TARGET -> Return the Target_list
          270 end % case
        271 end % case
      272 end % if

FIG. 11

FIA 1 FME Table 300

Entry # 1 301
302 Ingress Port 3
308 Ethernet Type == FCoE Type
309 DA_MAC == FCF_MAC
310 SA_MAC == T1_MAC
311 D_ID == T1_FCID
312 S_ID == T1_FCID
313 Action:
314 Insert DA_MAC == T1_MAC
315 Insert SA_MAC == FCF_MAC
316 Redirect to Port 1

Entry # 2 302
320 Ingress Ports 1
321 Ethernet Type == FCoE Type
322 DA_MAC == FCF_MAC
323 SA_MAC == T1_MAC
324 D_ID == T1_FCID
325 S_ID == T1_FCID
326 Action:
327 Insert DA_MAC == T1_MAC
328 Insert SA_MAC == FCF_MAC
329 Redirect to Port 3

Entry # 3 303
330 Ingress Ports Port Group A
331 Ethernet Type == FCoE Type
332 DA_MAC == T1_MAC
333 SA_MAC == I2_MAC
334 D_ID == T1_FCID
335 S_ID == I2_FCID
336 Action:
337 Insert DA_MAC == T1_MAC
338 Insert SA_MAC == FCF_MAC
339 Redirect to Port 3

Entry # 4 304
340 Ingress Ports 1, 2, 3
341 Ethernet Type == FIP Type
342 DA_MAC == FCF_MAC
343 SA_MAC == Any
344 Action:
345 Redirect to Port 4

Entry # 5 305
350 Ingress Ports 1, 2, 3
351 Ethernet Type == FCoE Type
352 DA_MAC == FCF_MAC
353 SA_MAC == Any
354 D_ID == FF:FF
355 Action:
356 Redirect to Port 4

Entry # 6 306
360 Ingress Ports 1, 2, 3, 4
361 Ethernet Type == FCoE Type
362 Action:
363 Deny

FIG. 13

Zoning Table 400

401 WWPN-I1 ZONE1 Vlan100 PCP_3
402 WWPN-I2 ZONE2 Vlan100 PCP_3
403 WWPN-T1 ZONE1 Vlan100 PCP_3
404 WWPN-T2 ZONE2 Vlan100 PCP_3

FIA 2 FME Table 410

Entry # 1 411
414 Ingress Ports Port Group B
415 Ethernet Type == FCoE Type
420 Vlan == 100, PCP == 3
416 DA_MAC == I2
417 SA_MAC == T1
418 D_ID == I2_FCID
419 S_ID == T1_FCID
Action:
421 Insert DA_MAC == I2_MAC
422 Insert SA_MAC == FCF_MAC
423 Redirect to Port 1

Entry # 2 412
430 Ingress Ports 1
431 Ethernet Type == FCoE Type
436 Vlan = 100, PCP == 3
432 DA_MAC == FCF_MAC
433 SA_MAC == I2_MAC
434 D_ID == T1_FCID
435 S_ID == I2_FCID
436 Action:
437 Insert DA_MAC == T1_MAC
438 Insert SA_MAC == I2_MAC
439 Redirect to Port Group B

FIG. 14

METHODS, SYSTEMS AND APPARATUS FOR THE CONTROL OF INTERCONNECTION OF FIBRE CHANNEL OVER ETHERNET DEVICES

PRIORITY CLAIM

This patent application is a continuation of application Ser. No. 13/547,848, filed Jul. 12, 2012, which is a continuation-in-part of the following U.S. patent applications: application Ser. No. 12/987,057, entitled "Methods, Systems and Apparatus for the Interconnection of Fibre Channel Over Ethernet Devices", application Ser. No. 12/987,063 entitled "Methods, Systems and Apparatus for the Interconnection of Fibre Channel Over Ethernet Devices Using a Fibre Channel Over Ethernet Interconnection Apparatus Controller", application Ser. No. 12/987,066 entitled "Methods, Systems, and Apparatus for the Servicing of Fibre Channel Fabric Login Frames", application Ser. No. 12/987,073 entitled "Methods, Systems and Apparatus for Utilizing an iSNS Server in a Network of Fibre Channel Over Ethernet Devices", application Ser. No. 12/987,077 entitled "Methods, Systems and Apparatus for the Interconnection of Fibre Channel Over Ethernet Devices Using a TRILL Network", application Ser. No. 12/987,076 entitled "Methods, Systems and Apparatus for Converged Network Adapters", and application Ser. No. 12/987,075 entitled "Methods, Systems and Apparatus for the Interconnection of Fibre Channel Over Ethernet Devices Using Shortest Path Bridging", all filed on Jan. 7, 2011, which are all incorporated herein by reference as if fully net forth herein.

FIELD OF THE INVENTION

The disclosures and embodiments of the invention relate to network systems and communications networks, more particularly, certain embodiments of the invention relate to a method and system for Fibre Channel over Ethernet networking. Fibre Channel networking, and Ethernet frame forwarding.

BACKGROUND OF THE INVENTION

There are at least two separate networks are found in Data Centers. The more ubiquitous of the networks, the Local Area Network (LAN) based on the Ethernet protocol, is mainly used for server to server and server to Internet communications. The other network, the Storage Area Network (SAN), is specialized to carry server to storage communications. The Data Center Storage Area Network is mainly based on the Fibre Channel protocol and has the following characteristics: low latency, high bandwidth, and a loss-less network. Recently there have been innovations to merge the Storage Area Network (SAN) with the Local Area Network. The promised benefits include a savings on the amount of equipment and the resulting savings on the amount of equipment real estate, power, and cooling required. Newly created standards comprising this LAN/SAN convergence define how Storage Area Network frames, namely Fibre Channel protocol frames, are mapped over the Ethernet network. These new frames are called Fibre Channel over Ethernet (FCoE) network frames. Additional standards define how to make the Ethernet network lossless, i.e., to add flow control at the network level to prevent Ethernet frames from being dropped due to congestion. Still other standards define how to segment the transmission line into classes that virtually separate the communications over the transmission line.

Converging the LAN and SAN networks has created additional complexity in the management, control, and data switching areas. Singly, the Fibre Channel switch fabric protocols are very complex and have shown to be not very interoperable between the small number of vendors who build products that support them. Mapping the Fibre Channel switch fabric protocols over Ethernet has resulted in a dizzying amount of new standards that have inhibited the market acceptance of the Fibre Channel over Ethernet (FCoE) mapping over this new converged network. New switches have been defined called Fibre Channel Forwarders (FCFs) and Fibre Channel Data Forwarders (FDFs), which add Fibre Channel over Ethernet and Ethernet elements to the already complex Fibre Channel switch architecture. FCFs and FDFs interconnect ENodes, which are Fibre Channel or devices nodes that are able to transmit Fibre Channel over Ethernet frames. There have been some standards and innovations applied to ENodes, and their embedded Virtual N_Ports (VN_Ports), to connect without using FCF's or FDF's. One of these efforts defines an ENode to ENode connection method, called VN_Port to VN_Port (VN2VN) whereby ENodes can connect to each other over a Lossless Ethernet network without an FCF or FDF. Other methods have been suggested to move some of the FCF/FDF intelligence to the ENode. Both the emerging VN2VN standard and the emerging direct ENode direct connect methods have many significant disadvantages. These disadvantages include but are not limited to: the requirement for the ENode to choose a unique MAC address for each VN_Port, the requirement for the ENode to choose a unique Fibre Channel address identifier for each VN_Port, the lack of visibility into the network's supported maximum frame size or other capabilities, the lack of standardized discovery of specific ENode types such as Storage targets, the lack of the ability to automatically and dynamically create Fibre Channel zones or access control lists (ACLs) for intermediate Ethernet bridges, the lack of visibility to load balance across several paths from a source ENode to a destination ENode based on FCID's, and the increased complexity to scale to hundreds of ENodes which requires error prone manual configuration. Due to the lack of Fibre Channel fabric control, these emerging ideas and standards target smaller networks of ENodes, which are impractical in today's Data Center.

In parallel with the innovations around converging the LAN and SAN, there have also been a trend to virtualize servers, i.e., consolidate a corporation's many underutilized servers onto fewer more utilized servers. The server visualization trend has many advantages, including more utilization of existing underutilized servers, lower equipment space, power, and cooling requirements since there are fewer servers. This trend results in fewer and higher utilized servers which have changed the traffic characteristics of the Local Area Network that interconnects them. The traffic requirements which used to be flowing from Internet to Server have changed to an any-to-any server flow. This migration in traffic patterns has produced a trend to "flatten"LANs, i.e., consolidate the normally three layers (core, distribution, and access) of switches commonly found in a Data Center to two layers (core and access). In parallel with this physical flattening trend is the trend towards utilizing layer 2 forwarding methods to keep the network in a single broadcast domain, which helps support any-to-any connection requirements of virtualized servers and their hypervisors. New link level protocols have been defined to accelerate the ability for any to any server based virtual machine communications. Many of these new link level protocols need new switch hardware and new ways to manage the resulting network.

What is needed is a simpler way to converge the LAN and SAN in a scalable and less complex method than the trajectory of both the standards committees and emerging ENode to ENode inventions. What is also needed is have this simpler method be more compatible with the trend towards flattening the large Data Center networks. Both simpler methods need to be easily managed, scalable, and interoperable. Accomplishing this would accelerate LAN/SAN network convergence trend and accelerate the flattening of the LAN to more easily attain the benefits of visualization, convergence, and consolidation.

BRIEF SUMMARY OF THE INVENTION

In one aspect of the inventions herein, a system is provided for interconnection of one or more Fibre Channel over Ethernet (FCoE) devices. The system preferably comprises a visualized or virtual server which in turn comprises a virtual machine having an FCoE device interconnection apparatus controller, a virtual switch, the virtual switch being coupled to the FCoE device interconnection apparatus controller, and a network interface. The network interface is coupled to the virtual switch, which in turn couples to an Ethernet fabric. A first Ethernet link couples the network interface to the Ethernet fabric. One or more Fibre Channel over Ethernet (FCoE) devices are coupled to the Ethernet fabric via Ethernet links.

In yet another aspect of the inventions, a system, method or apparatus provides for interconnection of one or more Fibre Channel over Ethernet (FCoE) devices under control of a FIAC virtual machine coupled to an Ethernet fabric. In one implementation, a FIP Discovery Advertisement frame is multi-cast over the Ethernet fabric to the one or more FCoE devices. The FIP Discovery Advertisement frame is received at the one or more FCoE devices. A response is then made from one or more of the FCoE devices to the FIAC virtual machine with a FIP Discovery Solicitation frame.

In yet another aspect of the invention, automatic zone configuration is implemented through use of best practices. In the discovering of initiators and targets in the system, zones are created so as to have one initiator with one target. By way of example, if two initiators are found and one target, the best practice rule will pair one initiator with one target in a zone, for a total of two zones.

In one aspect of the invention, the systems and methods use port groups, such as LAGs and MLAGs by FIAs in forwarding the FCoE frames. In the preferred implementation, this is accomplished without use of Fibre Channel based routing, such as FSPF.

In yet another aspect of the inventions, the systems and methods provide for automatic discovery of FIA ports attached to ENodes through use of the Bridge-MIB. In one aspect, if a MAC address is known, the Bridge-MIB is used to discover the port in the FIA to which the ENode is connected.

In yet another aspect, when multiple modules share a single database is utilized, a database trigger is provided within the system when a change is made to a database thereby informing other modules that a change occurred in the database.

In yet another aspect, the FMEs are preconfigured by a FIAC to optimize FME configuration. In one implementation, the FMEs are preloaded with filter table entries, such that a VN_Port is instantiated without the need to communicate with the FIA to set an FME.

In yet another aspect, in the transport of frames between two ENodes, the network between the ENodes being a TRILL network.

In yet another aspect, in the transport of frames between two ENodes, wherein the intervening network is a network using the Shortest Path Bridging (SPB) frame forwarding.

In yet another aspect of these inventions, the use of FIACs apply to various systems, topologies and architectures. By way of example, the FIAC is used in a redundant network, a redundant FIAC may be used in a redundant network, a FIAC may be used in a core/edge or leaf/spline network and/or a FIAC in a virtual chassis network.

BRIEF DESCRIPTION OF THE DRAWINGS

The drawings illustrate only exemplary embodiments of the invention and therefore do not limit its scope because the inventive concepts lend themselves to other equally effective embodiments.

FIG. 6 shows a redundant implementation of the FIAC, the FIAC running in a visualized server and capable of migrating to another visualized server upon failure of the visualized server the FIAC is currently running on.

FIG. 9 shows the FIA FME table for the FIA shown in FIG. 8.

FIG. 10 is a continuation of the FIA FME table for the FIA shown in FIG. 8.

FIG. 11 shows the function and method to discover which Fibre Channel N_Port identifiers (FCID) are in the same zones as the passed FCID.

FIG. 13 shows the FIA 1 FME table for the network in FIG. 12.

FIG. 14 shows both the FIA 1 and FIA 2 network zoning table and the FIA 2 FME table.

ACRONYMS

Figure 1:
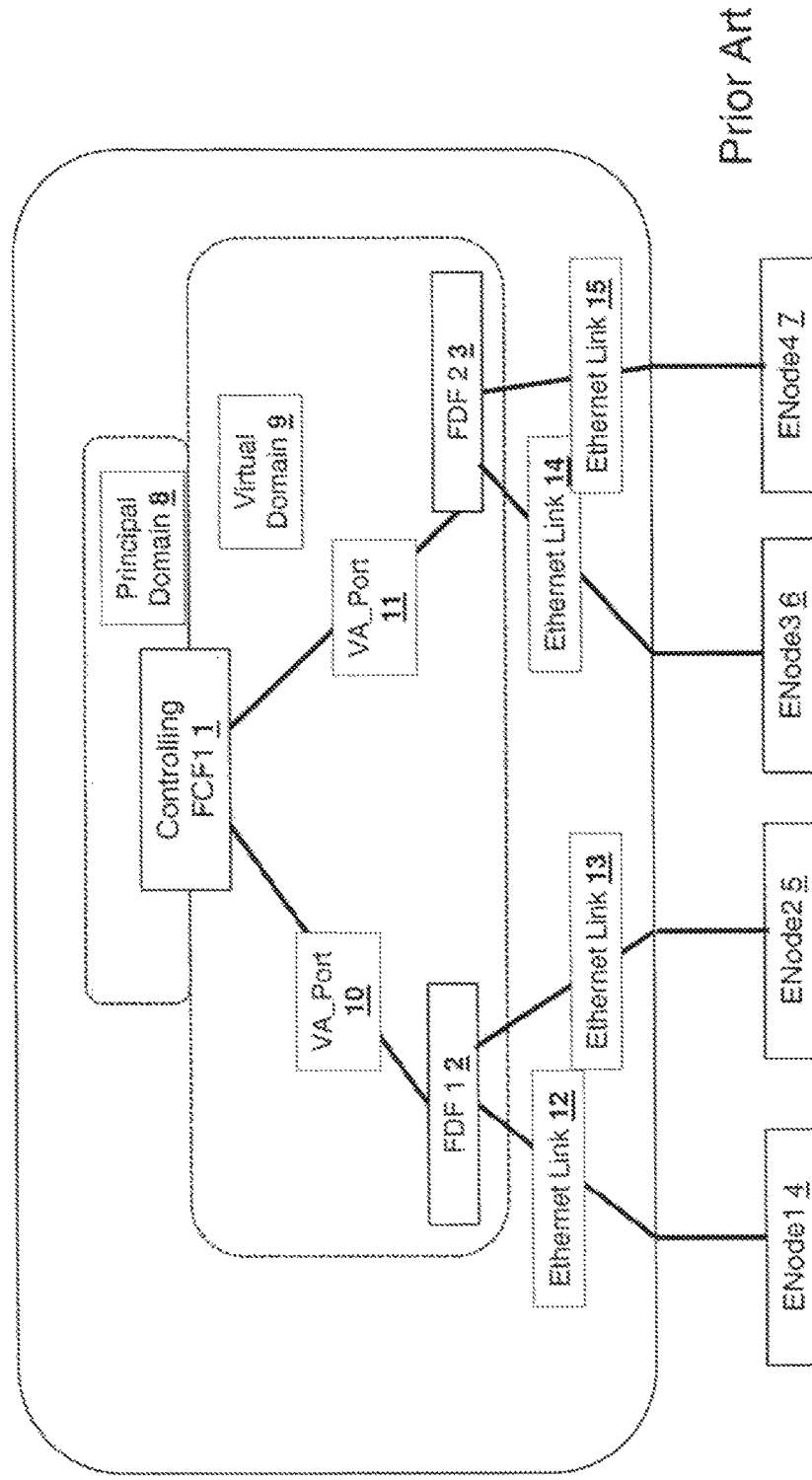
FIG. 1 shows an example of Distributed FCF composed of a Controlling FCF and two FDFs as described in the ANSI T11 FC-BB standards.

CNA Converged Network Adapter
DA Destination Address
DCB Data Center Bridging
DCBX DCB Exchange protocol
ENode FCoE Node
FCF FCoE Forwarder
FIA FCoE and FC Interconnection Apparatus
FIA Controller Apparatus that controls FIA's
FIB Forwarding Information Base
FC Fibre Channel
FCF-MAC FCoE Forwarder Media Access Control
FCID Fibre Channel address or port identifier
FCoE Fibre Channel over Ethernet
FCoE_LEP FCoE Link Endpoint
FDF FCoE Data Forwarder
FIP FCoE Initialization Protocol
FME Frame Match Entry
FPMA Fabric Provided MAC Address
IEEE Institute of Electrical and Electronics Engine
MLAG Multi-chassis Link Aggregation
LAG Link Aggregation Group
LAN Local Area Network
MAC Media Access Control
PCP Priority Field in the VLAN Tag
RBridge Routing Bridge
SA Source Address
SNMP Simple Network Management Protocol
SPF Shortest Path First
TRILL Transparent Interconnection of Lots of Links
VE_Port Virtual E_Port
VF_Port Virtual F_Port
VID VLAN Identifier
VLAN Virtual Local Area Network
VN_Port Virtual N_Port
vSwitch Virtual Switch

CONSTANTS

| | | |
|---|---|---|
| FIP_TYPE: | 8914h | The value specified in the Ethernet TYPE field for a FIP PDU |
| FCoE_TYPE: | 8906h | The value specified in the Ethernet TYPE field for an FCoE PDU |
| All-FCoE-MACs: | 01-10-18-01-00-00 | The group address for all FCoE devices. |
| All-ENode-MACs: | 01-10-18-01-00-01 | The group address for all ENodes |
| DEFAULT_FC-MAP: | 0EFC00h | The default value for the FC-MAP field in a FIP FC-MAP descriptor |

DEFINITIONS

Address or Port identifier: An address value used to identify source (S_ID) or destination (D_ID) of a frame.

Controlling FCF: An FCF able to control a set of FDFs in order to create a Distributed FCF.

Controlling FCF Set: The Switch_Names of the up to two Controlling FCFs that are part of a Distributed FCF.

Converged Network Adapter (CNA): is a technology that supports data networking (TCP/IP) and storage networking (Fibre Channel) traffic on a single I/O adapter. CNA's support both Enhanced Ethernet and Fibre Channel over Ethernet (FCoE).

Distributed FCF: A set of FDFs associated with at least one Controlling FCF, that controls the operations of the set of FDFs. A Distributed FCF is defined by the administrative configuration of the Controlling FCF Set and of the FDF Set.

Domain Identifier: Bits 23 through 16 of an address identifier.

Encapsulated FC frame: An SOF/EOF delimited FC frame prefixed with a 28-byte FC frame Encapsulation Header (see RFC 3643).

ENode: An FCoE Node, a Ether Channel node (see FC-FS-3) that is able to transmit FCoE frames using one or more ENode MACs.

ENode MAC: A Lossless Ethernet MAC coupled with an FCoE Controller in an ENode.

ENode MAC address: The MAC address used by the FCoE Controller on an ENode MAC for the FCoE Initialization Protocol (FIP).

Fabric: As defined in FC-FS-3 an entity that interconnects various Nx_Ports attached to it, and is capable of muting frames using only the D_ID information in an FC-2 frame header. A Fabric may also refer to an Ethernet network comprised of one or more Ethernet switches or FIAs.

FIA: An FCoE interconnect apparatus. Some examples may include an Ethernet switch, an Ethernet bridge or an Ethernet router.

FIB (Forwarding Information Base): also known as a forwarding table, is most commonly used in network bridging, routing and similar functions to find the proper interface to which the input interface should send a packet to be transmitted by the bridge, switch, router or similar device.

FCF (FCoE Forwarder): A Fibre Channel Switching Element (see FC-SW-5) that is able to forward FCoE frames across one or more FCF-MACs, and that optionally includes one or more Lossless Ethernet bridging elements and/or a Fibre Channel Fabric interface.

FDF (FCoE Data-Plane Forwarder): A simplified FCoE switching entity that forwards FC frames among VA_Ports and VF_Ports through a FCDF Switching Element. An FDF shall support at least one VA_Port capable FDF-MAC and may support one or more VF_Port capable FDF-MAC. Each FDF-MAC shall be coupled with an FCoE Controller function and may be coupled with a lossless Ethernet bridging element.

FDF Set: The Switch_Names of the FDFs that are part of a Distributed FCF.

FIA: A FCoE and FC interconnection apparatus. The interconnection apparatus interconnects devices selected from the list which may include but not be limited to FCoE ENodes, Fibre Channel devices, FCF's, FDF's. An FIA may also be a FCoE only interconnection apparatus, i.e., not capable of handling Fibre Channel frames not embedded in Ethernet frames.

FCF-MAC: A Lossless Ethernet MAC coupled with an FCoE Controller in an FCF.

FCF-MAC address: The MAC address of an FCF-MAC.

FCoE Controller. A functional entity, coupled with a Lossless Ethernet MAC, instantiating and de-instantiating VE_Ports, VF_Ports, VN_Ports, and/or FCoE_LEPs.

FCoE Entity: The interface, containing one or more FCoE_LEPs, between a VN_Port, a VF_Port, or a VE_Port, and a Lossless Ethernet MAC.

FCoE frame: An Ethernet frame (see IEEE 802.3-2008) that contains an FCoE PDU

FCoE_LEP (FCoE link End-Point): The data forwarding component of an FCoE Entity that handles FC frame encapsulation-decapsulation, and transmission/reception of encapsulated frames through a single Virtual Link.

FDF (FCoE Data Forwarder): a Fibre Channel Switching Element (see FC-SW-5) that is able to forward FCoE frames across on or more FCF-MACs, and that optionally includes one or more Lossless Ethernet bridging elements. A FDF comprises a subset of FCF features, most notably routing and zoning. A FDF is controlled by a FCF.

FIP frame: An Ethernet frame (see IEEE 802.3-2008) containing a FCoE Initialization Protocol (FIP) PDU.

FLOGI: Fabric Login ELS (see FC-LS-2).

Link Aggregation: link Aggregation is a term to describe various methods of combining (aggregating) multiple network connections in parallel to increase throughput beyond what a single connection could sustain, and to provide redundancy in case one of the links fails. Further umbrella terms used to describe the method include port trunking, link bundling, Ethernet/network/NIC bonding, or NIC teaming. These umbrella terms not only encompass vendor-independent standards such as IEEE 802.1ax Link Aggregation Control Protocol (LACP) for wired Ethernet, or the previous IEEE 802.3ad, but also various proprietary solutions.

Lossless Ethernet bridging element: An Ethernet bridging function operating across Lossless Ethernet MACs.

Lossless Ethernet MAC: A full duplex Ethernet MAC implementing extensions to avoid Ethernet frame loss due to congestion (e.g., the PAUSE mechanism (see IEEE 802.3-2008) or the Priority-based Flow Control mechanism (see IEEE 802.1Qbb))

LS_ACC: Link Service Accept (see FC-LS-2).

Lossless Ethernet network: An Ethernet network composed only of full duplex links, Lossless Ethernet MACs, and Lossless Ethernet bridging elements.

LS_RJT: Link Service Reject (see FC-LS-2).

Multicast MAC address: A MAC address associated with a group of logically related Ethernet stations on an Ethernet network and called a Multicast-Group Address in IEEE 802.3-2008.

N_Port: A device port that generates/terminates FC-4 channel traffic.

N_Port_Name: A Name_Identifier that identifies an N_Port.

PLOGI: N_Port Login (see FC-LS-2).

Unicast MAC address: A MAC address associated with a particular Ethernet station on an Ethernet network and called an Individual Address in IEEE 802.3-2008.

VA_Port (Virtual A_Port): An instance of the FC-2V sublevel of Fibre Channel that communicates with another VA_Port and that is dynamically instantiated on successful completion of a FIP ELP Exchange. A VA_Port is uniquely identified by an A_Port_Name Name_Identifier and is addressable by the VA_Port connected to it through the A_Port Controller address identifier (i.e., FFFFF9h).

VA_Port/FCoE_LEP pair: A VA_Port and its associated FCoE_LEP.

Virtual Switch: is a software program that allows one virtual machine (VM) to communicate with another virtual machine (VM). A virtual machine can intelligently direct communication on the network by inspecting packets before passing them on.

VF_Port/FCoE_LEP pair: A VF_Port and one of its associated FCoE_LEPs.

VF_Port/FCoE_LEP pair: A VN_Port and its associated FCoE_LEP.

Virtual Link: The logical link connecting two FCoE_LEPs.

Virtual Chassis: Virtual chassis is a technology that allows multiple physically separate Ethernet switches to be combined into a single logical entity for the purpose of simplifying management and configuration.

VN_Port (Virtual N_Port): An instance of the FC-2V sublevel of Fibre Channel that operates as an N_Port (see FC-FS-3) and is dynamically instantiated on successful completion of a FIP FLOGI or FIP NPIV FDISC Exchange.

VN_Port MAC address: The MAC address used by an ENode for a particular VN_Port.

Zone: A group of Zone Members. Members of a Zone are made aware of each other, but not made aware of Zone Members outside the Zone.

Zone Definition: The parameters that define a Zone.

Zone Member: The specification of a device to be included in a Zone.

DETAILED DESCRIPTION OF THE INVENTION

FIG. 1 shows an example of Distributed FCF composed of a Controlling FCF 1 and two FDFs 2 3 as described in the ANSI T11 FC-BB standards. The Controlling FCF 1 uses a Virtual Domain_ID to perform N_Port_ID allocations for ENodes 4 5 6 7 connected to the FDF Set 2 3 of the Distributed FCF (i.e., the Virtual Domain_ID is used as the most significant byte in all N_Port_IDs allocated to ENodes that are attached to the FDF Set). The Controlling FCF 1 uses also another Domain_ID, called Principal Domain, for its normal functions as an FCF. As a result, a Distributed FCF such as the one shown in FIG. 1 uses two Domain_IDs: one for the Principal Domain 8 and one for the Virtual Domain 9. To property support the operations of a Virtual Domain 9, a Controlling FCF 1 shall have a Switch_Name to associate with the Virtual Domain 9, in addition to its own Switch_Name. FDFs are not able to operate properly without a Controlling FCF 1, therefore the Controlling FCF 1 is a single point of failure in a Distributed Switch configuration with only one Controlling Switch, as the one shown in FIG. 1. To avoid this issue, Distributed FCFs may support a redundant configuration of two Controlling FCFs, a Primary one and a Secondary one. The Secondary Controlling FCF keeps its state synchronized with the Primary and is able to take its place in case of failure according to the Controlling Switch Redundancy Protocol (see T11/11-224v0).

Figure 2:
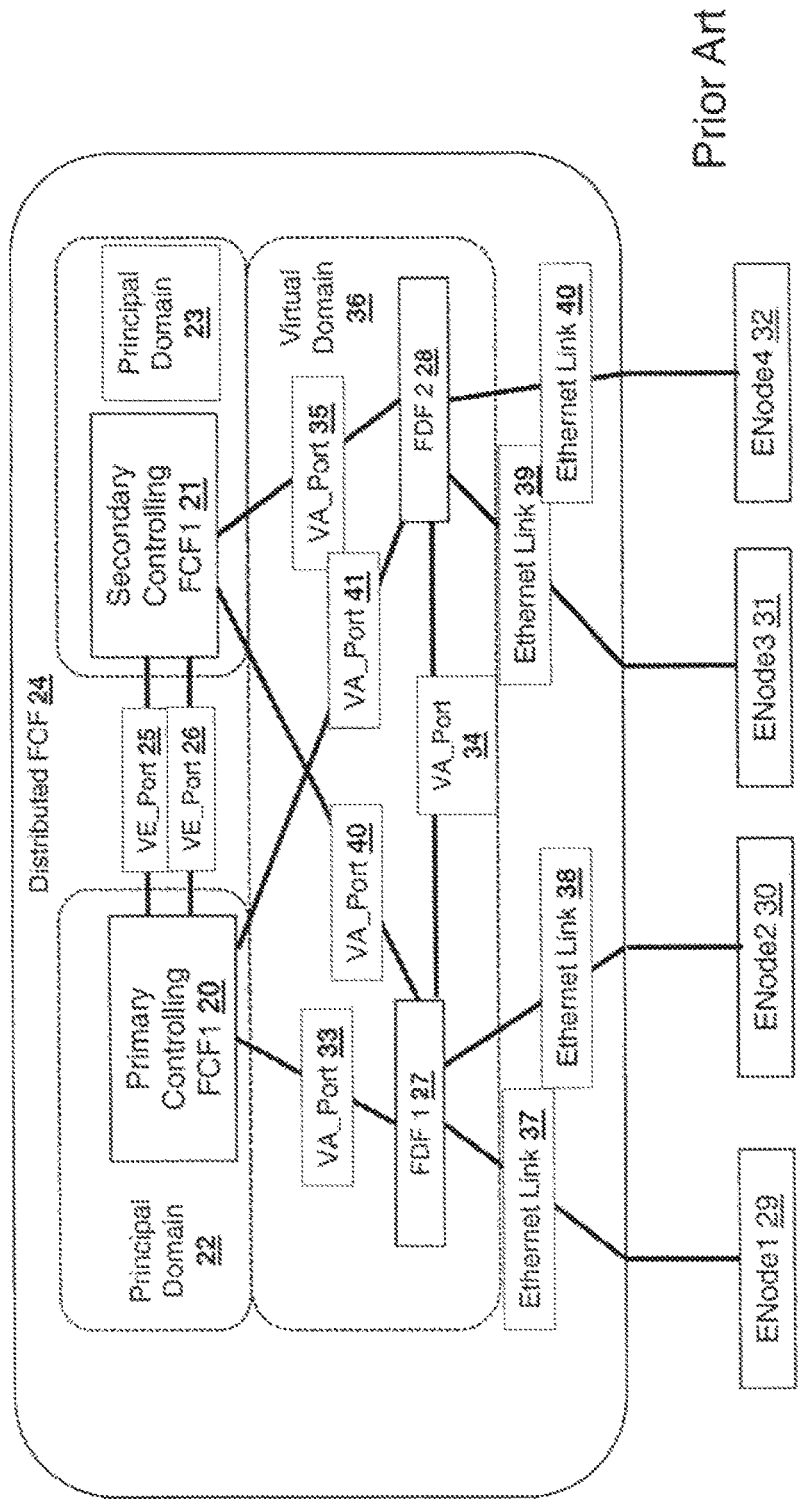
FIG. 2 shows an example of a Distributed FCF including a redundant pair of Controlling FCFs as described in the ANSI T11 FC-BB standard.

FIG. 2 shows an example of a Distributed FCF including a redundant pair of Controlling FCFs, i.e., a primary FCF 20 and a secondary FCF 21 as described in the ANSI T11 FC-BB standards. A Distributed FCF is a set of FDFs associated with at least one Controlling FCF that controls the operations of the set of FDFs. The two Controlling FCFs 20 21 in a redundant Distributed FCF instantiate at least two Augmented VE_Port to VE_Port Virtual Links 25 26 between themselves, where the term 'augmented' indicates that Virtual Link is used also for the Redundancy protocol, in addition to normal VE_Port operation (see T11/11-224v0). The Controlling FCFs use a Virtual Domain_ID to perform N_Port_ID allocations for ENodes 29 30 31 32 connected to the FDF Set 27 28 of the Distributed FCF (i.e., the Virtual Domain_ID is used as the most significant byte in all N_Port_IDs allocated to ENodes that are attached to the FDF Set). Using a Virtual Domain_ID to assign N_Port_IDs enables seamless operation in case of failures of one of the two redundant Controlling FCFs. Each Controlling FCF 20 21 uses also another Domain_ID, called Principal Domain 23, for its normal functions as an FCF. As a result, a redundant Distributed FCF typically uses three Domain_IDs: one for each Controlling FCF 20 21 and one for the Virtual Domain_ID. To properly support the operations of a Virtual Domain 36, a Controlling FCF shall have a Switch_Name to associate with the Virtual Domain 36, in addition to its own Switch_Name. The two redundant Controlling FCFs instantiate VA_Port to VA_Port Virtual Links 33 34 35 40 41 to enable the forwarding of FCoE frames and the communication of control information between Controlling FCFs 20 21 and FDFs 27 28. In a redundant configuration, FDFs instantiate VA_Port to VA_Port Virtual Links to each of the Controlling FCFs 33 34 35 40 41 and between themselves 34, if they are directly reachable through the Ethernet topology. A Distributed FCF may have a cascaded FDF configuration when FDFs with at least two VA_Port capable FDF-MACs and independent Lossless Ethernet Bridging Elements are used.

Figure 3:
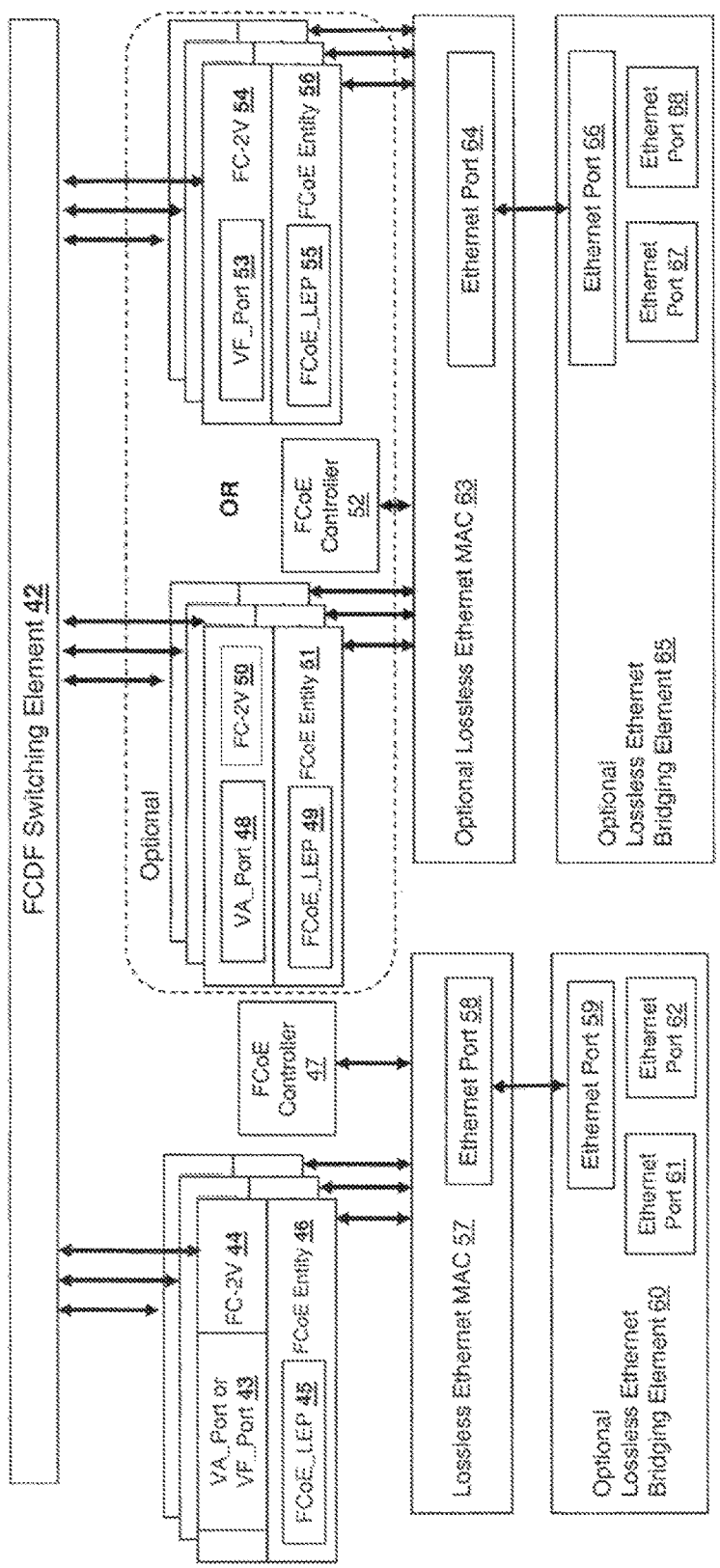
FIG. 3 shows the FDF functional mode as described in the ANSI T11 FC-BB standard.

FIG. 3 shows the FDF functional model as described in the ANSI FC-BB standard. An FDF is functionally composed of an FCDF Switching Element 42 (sec FC-SW-6) with at least one Lossless Ethernet MAC 57 (FDF-MAC). Each FDF-MAC 57 shall be coupled with an FCoE Controller 47 52 function. Each FDF-MAC may be coupled with a Lossless Ethernet bridging element 60 65. An FDF supports the instantiation of VA_Ports 43 48 or VF_Ports 53 over its FDF-MACs. The FCDF Switching Element 42 may be coupled with a Fibre Channel Fabric interface (not shown in the figure), providing native A_Port and F_Port connectivity. An FDF forwards FCoE frames addressed to one of its FDF-MACs based on the D_ID of the encapsulated FC frames. The FCoE Controller 47 52 is the functional entity that performs the FCoE Initialization Protocol (FIP) and instantiates or de-instantiates VA_Ports or VF_Ports, as needed. For a VA_Port capable FDF-MAC, the FCoE Controller 47 52:

a) optionally performs the FIP VLAN discovery protocol to discover FCoE VLANs;
b) discovers other VA_Port capable FDF-MACs and VA_Port/VE_Port capable FCF-MACs connected to the same lossless Ethernet network using the FIP discovery protocol;
c) instantiates a VA_Port/FCoE_LEP 43 45 48 49 pair on successful completion of each FIP ELP Exchange with a remote VA_Port capable FDF-MAC or VA_Port/VE_Port capable FCF-MAC;
d) de-instantiates a VA_Port/FCoE_LEP pair on receiving a FIP Clear Virtual link request;
e) monitors the status of the instantiated VA_Port/FCoE_LEP pairs;
f) initiates FIP Clear Virtual link requests as needed to terminate Virtual Links to other VA_Ports;
g) transmits periodic FIP Discovery Advertisements to the All-FCF-MACs address every FKA_ADV_PERIOD; and
h) monitors the status of remote VA_Ports by maintaining timers and verifying that periodic FIP Discovery Advertisements are received within every FKA_ADV_PERIOD.

The FCoE_LEP 45 49 55 is the functional entity performing the encapsulation of FC frames into FCoE frames in transmission and the decapsulation of FCoE frames into FC frames in reception. An FCoE_LEP 45 49 55 operates according to the MAC address of the local link end-point and the MAC address of the remote link end-point. When encapsulating FC frames into FCoE frames, the MAC address of the local link end-point shall be used as source address and the MAC address of the remote link end-point shall be used as destination address of the generated FCoE frame. When decapsulating FC frames from FCoE frames, the FCoE_LEP shall verify that the destination address of the received FCoE frame is equal to the MAC address of the local link end-point and shall verify that the source address of the received FCoE frame is equal to the MAC address of the remote link end-point. If either check fails the FCoE frame shall be discarded. For a VA_Port capable FDF-MAC, the MAC address of the local link end-point is the FDF-MAC address and the MAC address of the remote link end-point is the MAC address of the remote FDF-MAC or FCF-MAC with which a FIP ELP Exchange has been successfully completed.

A VA_Port 43 48 is an instance of the FC-2V 44 50 sublevel of Fibre Channel that is dynamically instantiated together with its FCoE_LEP 45 49 on successful completion of a FIP ELP Exchange, according to the rules specified in the FC-BB 6 standard. A VA_Port receives FC frames from the FCDF Switching Element 42 and sends them to its FCoE_LEP 45 49 55 for encapsulation and transmission over the Lossless Ethernet network. In a similar way, a VA_Port sends FC frames received from its FCoE_LEP to the FCDF Switching element 42. A VA_Port is uniquely identified by an A_Port_Name Name_Identifier and is addressed by the A_Port Controller address identifier (i.e., FFFFF9h). To initialize VA_Port to VA_Port links, i.e., links between FDFs, a successful completion of a FIP ELP Exchange is required. After successful FIP ELP Exchange, the FCoE Controllers of the two involved VA_Port capable FDF-MACs instantiate a VA_Port/FCoE_LEP pair.

Another topology defined by the ANSI T11 standards includes the instantiation of VN_Port to VN_Port links, i.e., direct attachment between ENodes. A VN2VN ENode MAC, operating in either multipoint or point-to-point mode, instantiates VN_Port to VN_Port Virtual Links on successful completion of a point-to-point FIP FLOGI, as defined in FC-LS-2. Both FIP FLOGI Request and LS_ACC shall have the Locally Unique N_Port_ID of the originating VN2VN_Port as S_ID, the locally Unique N_Port_ID of the destination VN2VN_Port as D_ID for the point-to-point FLOGI protocol, and the originating VN_Port FPMA in the MAC Address descriptor. The MAC addresses of the FIP FLOGI Request and LS_ACC shall be the ENode MAC addresses of the involved VN2VN_Ports. As specified in FC-LS-2, the VN2VN_Port with the greater N_Port_Name proceeds to N_Port Login, with the PLOGI ELS encapsulated in FCoE. Both FCoE PLOGI Request and LS_ACC shall have the Locally Unique N_Port_ID of the originating VN2VN_Port as S_ID and the Locally Unique N_Port_ID of the destination VN2VN_Port as D_ID. Upon completion of FCoE PLOGI the involved VN_Ports operate in point-to-point mode (see FC-LS-2). A VN_Port to VN_Port Virtual Link is explicitly deinstantiated by performing a FIP LOGO, that deinstantiates the FCoE_LEPs and performs a N_Port logout. The S_ID and D_ID on the encapsulated LOGO ELS shall be set to the Locally Unique N_Port_IDs of the involved VN2VN_Ports. The VN_Port to VN_Port capability is limited due to scalability and ENode complexity in implementation issues.

Figure 4:
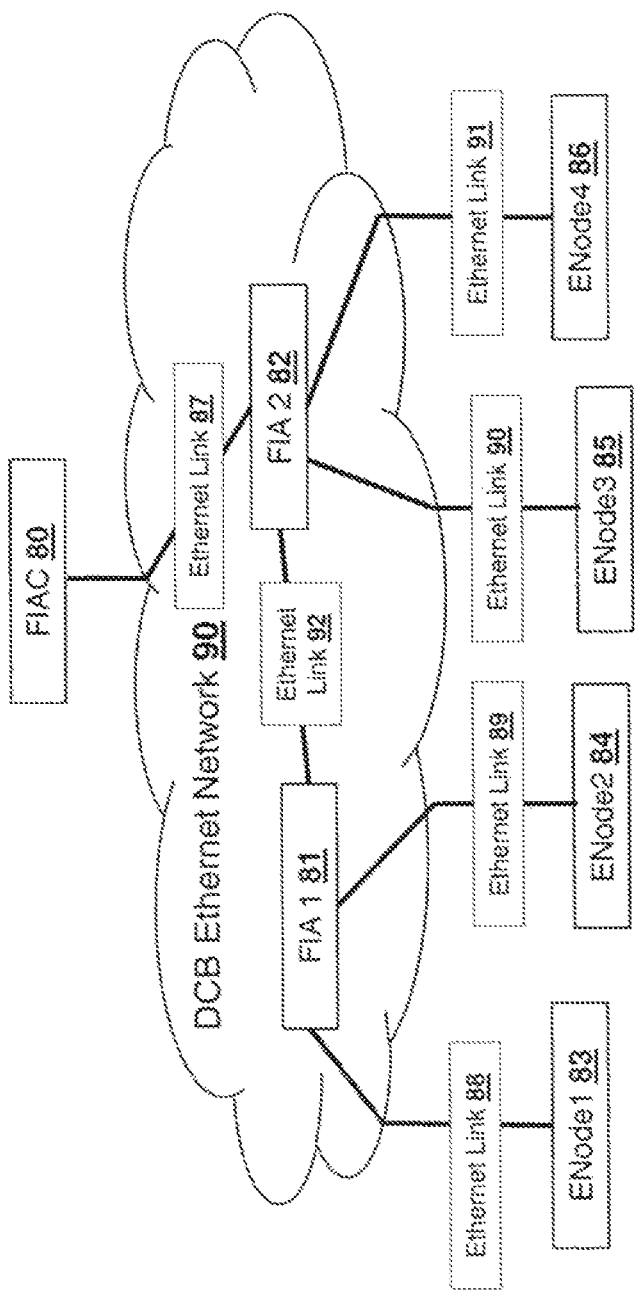
FIG. 4 shows an example of the current invention, an FIAC coupled to an Ethernet network comprised of two FIAs, the Ethernet network is coupled to four ENodes

FIG. 4 shows one example of the current invention, an FIAC 80 coupled to an Ethernet network 90, comprised of two FIAs 81 82, the Ethernet network coupled to four ENodes 88, 89, 90, 91. FIA 1 81 is connected to ENode1 83 through Ethernet link 88 and to ENode2 84 through Ethernet link 89. FIA 2 82 is connected to ENode 3 85 through Ethernet link 90 and to ENode 4 86 through Ethernet link 91. FIA 2 82 is also connected to the FIAC through Ethernet link 87. FIA 1 81 is connected to FIA 2 82 through Ethernet link 92. The FIAC 80 can communicate to the FIA's through the Ethernet links to set and remove FIA FME's. The FIAC 80 can also communicate through the Ethernet links and the FIA's to the attached ENodes 83, 84, 85, 86 to exchange FCoE initialization Protocol (FIP) frames and FCoE control frames. Specialized FCF/FDF VA_Port and VE_Port protocols are not applicable to this simplified FCoE device interconnection network. This allows the use of standard FIAs, e.g., standard 10G/40G Ethernet switches, which lowers the cost and complexity for deploying FCoE networks. The MAC 80 can use any number of Domain_IDs, from one to two hundred and fifty five, at its option, and not restricted to the Domain_ID assignments for previously defined Controlling and Distributed FCFs, i.e., there is no concept of a Principle or Virtual Domain although they can be implemented/simulated if necessary. It should be noted that the FIAC 80 in FIG. 4 differs from the FCF in FIG. 1 and FIG. 2. The FIAC 80 may not implement VA_Port and VE_Port interswitch link (ISL) protocols, including discovery, notification, and other ISL functions. The FIAC 80 may not depend on FDF functioned switches FIG. 2 27 28, including the VA_Port protocols and communication capabilities. The FIAC 80 may not have any switching, bridging or forwarding capabilities similar to the functions inherent in a FCF switch. This allows the MAC 80 to be separate from the switching function, i.e., separating the control functions from the data forwarding functions. Software Defined Networks is a method of separating the frame forwarding or switching control functions from the data forwarding functions. The FIAC 80 supports a special form of Software Defined Networks which is Software Defined Storage Networks™ (SDSN). The FIAC 80 contains the ability to configure standard FIA frame filter tables with certain match rules and actions to create the functions necessary for network attached ENodes to communicate with each other. Some examples of FIA implementations include an Ethernet switch, an Ethernet bridge or an Ethernet router.

Figure 5:
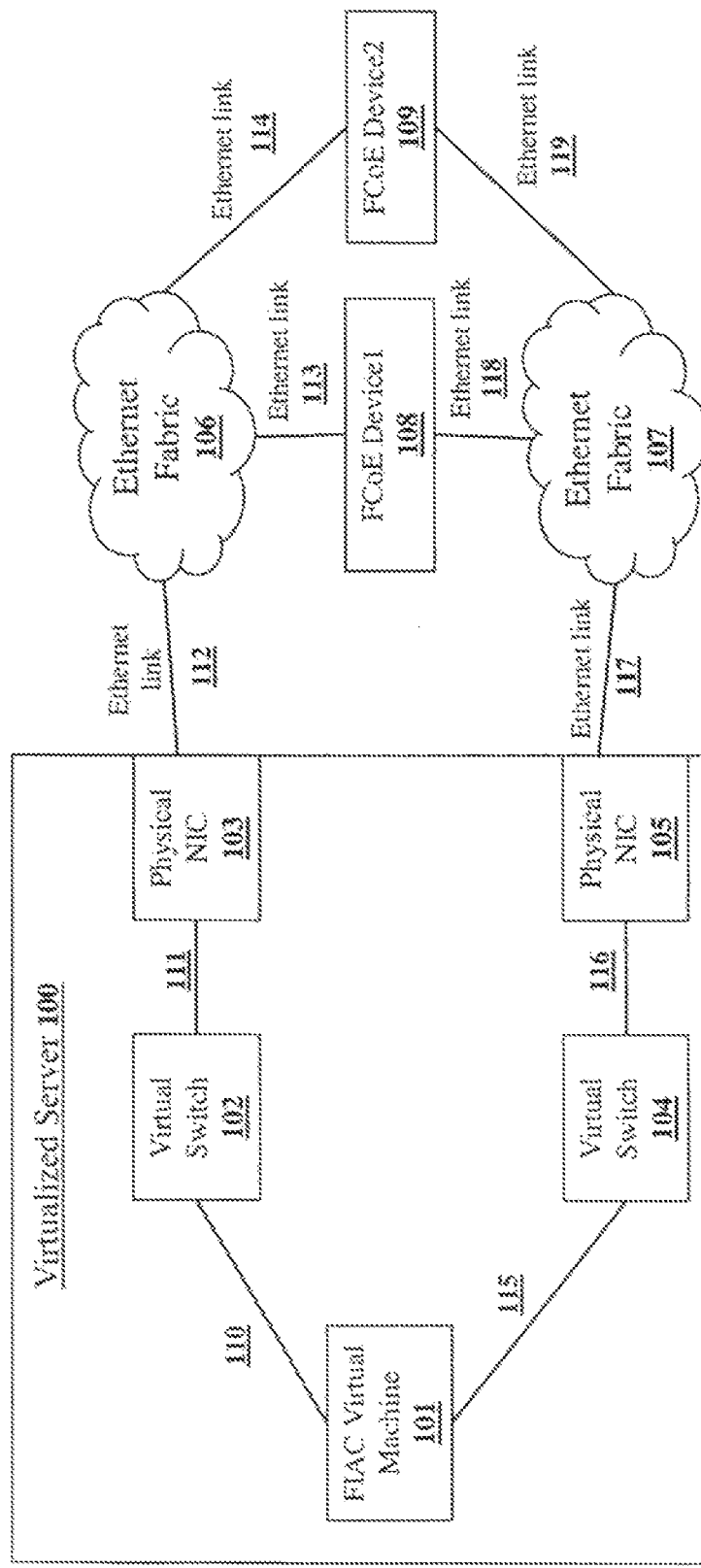
FIG. 5 shows one implementation of the FIAC as a virtual machine in a visualized server.
Figure 6:
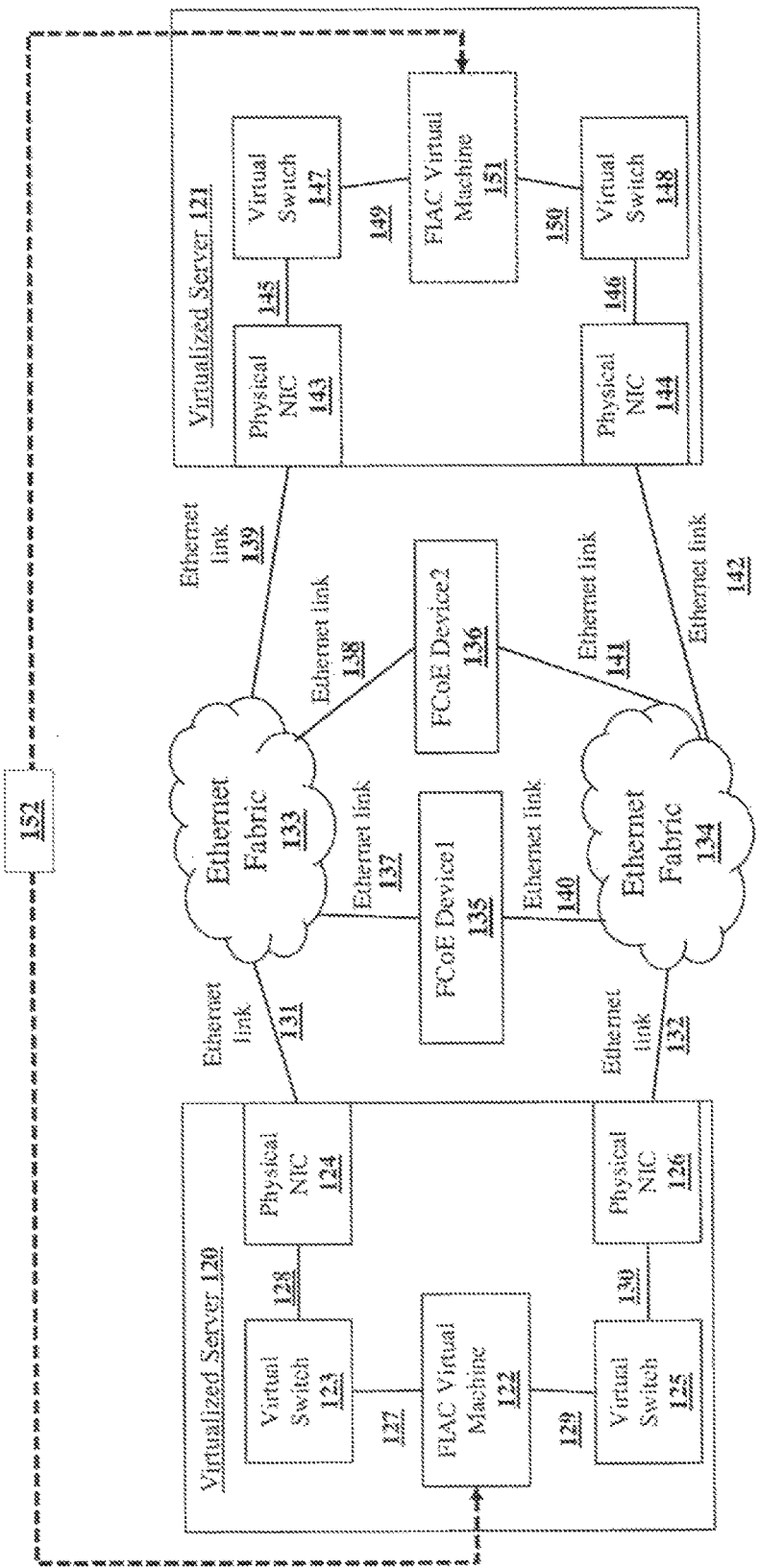

FIG. 5 shows one example implementation of an FIAC. The FIAC 101 is a virtual machine in a virtualized server 100. An example of a virtualized server is a server running the VMWare ESXi hypervisor, the Citrix Xen hypervisor, the Linux KVM hypervisor or the Microsoft HyperV hypervisor. FIG. 5 shows the FIAC 101 coupled to two virtual switches 102, 104. Each Virtual switch will connect to a different fabric so the traditional dual storage fabrics topology can be implemented. Virtual switch 102 is coupled 111 to a physical NIC 103. Virtual switch 104 is coupled 116 to physical NIC 105. The physical NICs can comprise a 10 Gbps Ethernet NIC, a 40 Gbps Ethernet NIC, a 100 Gbps Ethernet NIC or any other network interface. Physical NIC 103 is connected through an Ethernet link 112 to an Ethernet fabric 106. Physical NIC 105 is connected through an Ethernet link 117 to an Ethernet fabric 107. Ethernet Fabric 106 is connected to FCoE device 1 108 through Ethernet link 113 and connected to FCoE device 2 109 through Ethernet link 114. Ethernet Fabric 107 is connected to FCoE device 1 108 through Ethernet link 118 and connected to FCoE device 2 109 through Ethernet link 119. FIG. 5 shows two network connections between FCoE device 1 108 and FCoE device 2 109. The first network connection is through Ethernet link 113, Ethernet Fabric 106 and Ethernet link 114. The second network connection is through Ethernet link 118, Ethernet Fabric 107 and Ethernet link 119. This represents a best practice network redundant network interconnect between FCoE devices 108, 109. The FIAC 101 is connected to both Ethernet fabrics through the physical NICs 103, 105 and Ethernet links 112 117. The FIAC 101 communicates with the attached FCoE devices over the FCoE Initialization Protocol (FIP) and through FCoE fabric services protocols. Since the diagram shows two different networks, the FIAC communicates with each Ethernet fabric 106, 107 or network using different FIAC MAC addresses over each network FIG. 6 shows a redundant implementation of the FIAC, the FIAC running in a virtualized server capable of being migrated to another virtualized server. The FIAC 122 is running in a virtualized server 120. The FIAC 122 is coupled 127 129 to two virtual switches 123 125 which are coupled 128 130 to physical NICs 124 126. The two physical NICs 124 126 are coupled 131 132 to two separate Ethernet fabrics 133 134 which implement dual storage network fabrics. Two FCoE Devices 135 136 are coupled to each Ethernet Fabric 133 134 through Ethernet links 137 138 140 141. There is a second virtualized server 121 that comprises two virtual switches 147 148, the said virtual switches coupled 145 146 to physical NICs 143 144. The physical NICs 143 144 are coupled to two Ethernet fabrics 133 134 through Ethernet links 139 142. The FIAC Virtual Machine labeled dotted box 151 represents the movement of the FIAC 122 in virtualized server 120 in case of server failure. Dotted line 152 symbolizes the movement of the FIAC virtual machine to the second virtualized server 121 resulting in the FIAC operating 151 in the said second virtualized server 121.

Figure 7:
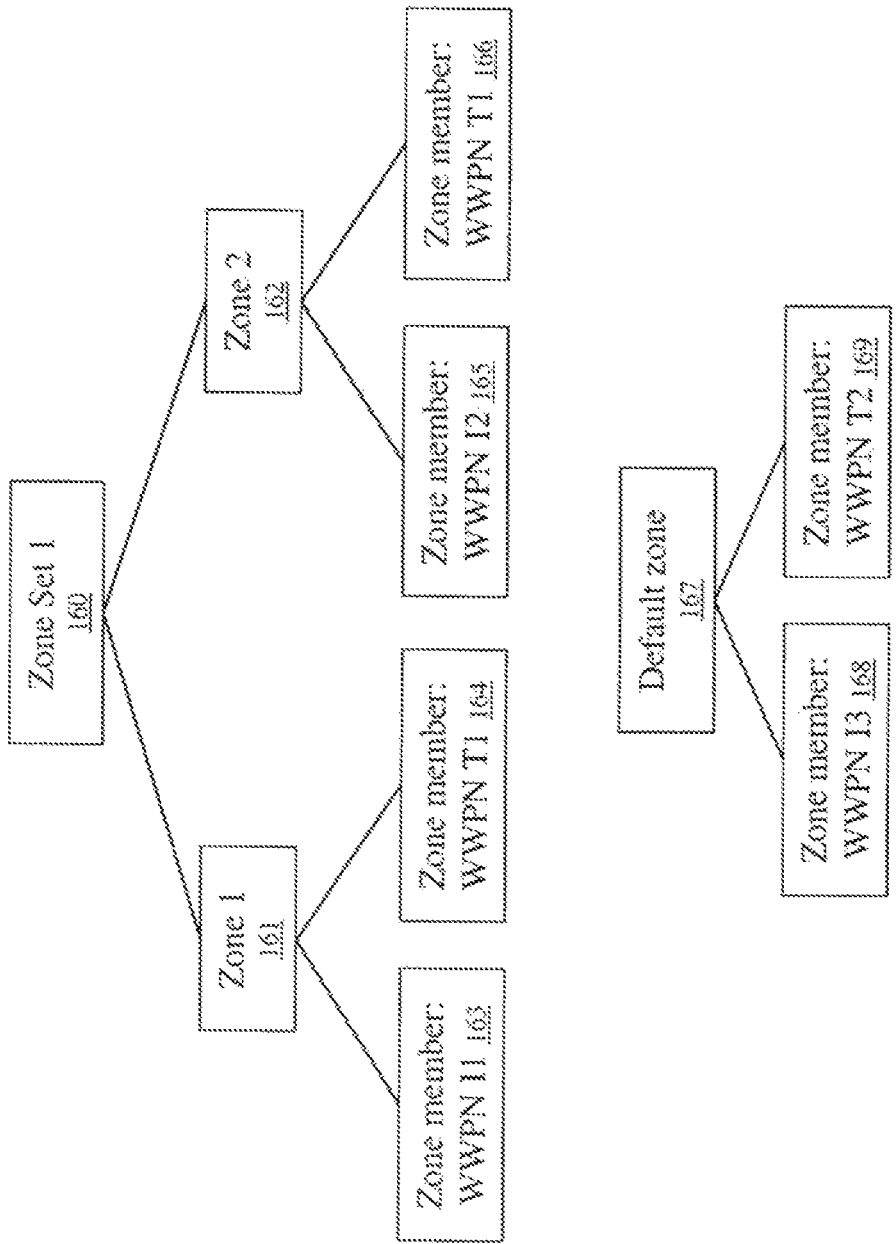
FIG. 7 shows a preconfigured zone set along with a default zone set for the network shown in FIG. 8.

FIG. 7 shows an active zone set 160 along with a default zone set 167. The zone set 160 contains two zones, Zone 1 161 and Zone 2 162. Zone 1 161 comprises zone members I1 163, refer to FIG. 8 181 and T1 164, refer to FIG. 8 183. Zone 2 162 comprises zone members I2 165, refer to FIG. 8 182 and T1 166, refer to FIG. 8 183. Also shown is the default zone 167, the zone where ENodes are added when they are discovered and not currently defined in the active zone set 160. The zone members are identified by the Worldwide Port Names for I1, symbolically named WWPN I1 163, T1, symbolically named WWPN T1 164, I2, symbolically named WWPN I2 165, I3, symbolically named WWPN I3 168, and T2, symbolically named WWPN T2 169. Zone set 1 implements best practice zoning by separating the each initiator in its own separate zone.

Figure 8:
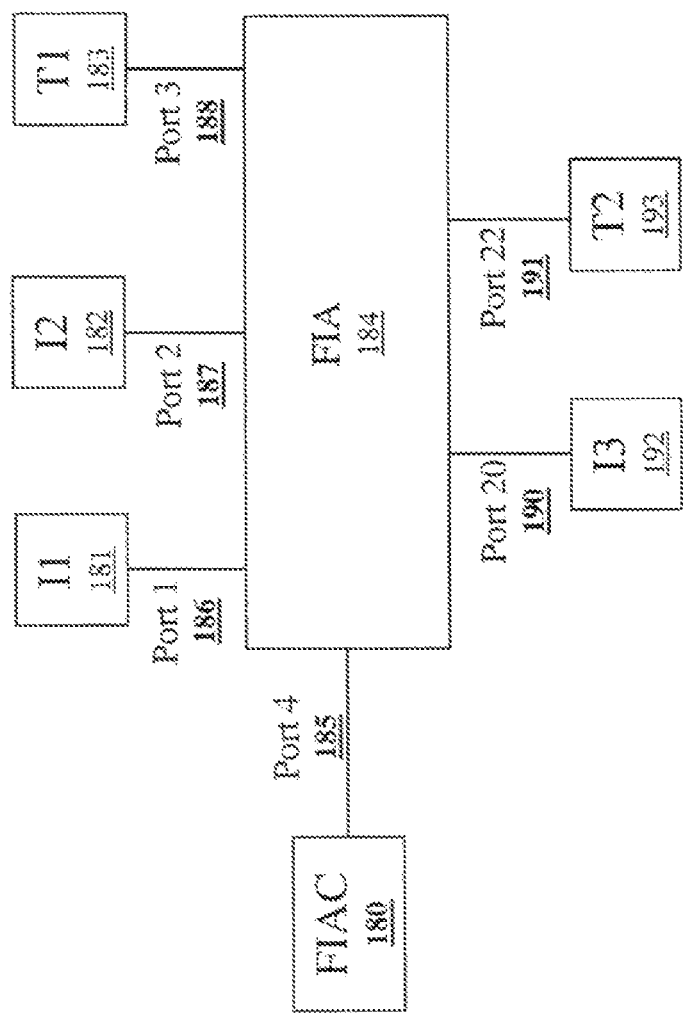
FIG. 8 shows a network comprised of three initiators, two targets, an FIA and an FIAC.

FIG. 8 shows a network comprised of three initiators, I1 181, I2 182 and I3 192 and two targets T1 183 and T2 193, an FIA 184 and a FIAC 180. The FIAC 180 is connected to FIA 184 Port 4 185. I1 181 is connected to FIA 184 Port 1 186. I2 182 is connected to FIA 184 Port 2 187. I3 192 is connected to FIA 184 Port 20 190. T1 183 is connected to FIA Port 3 188. The FIAC 184 communicates with I1 181, I2 182, I3 192, T1 183 and T2 193 through the FIP protocol and through FCoE frames accessing the fabric services in the FIAC 180.

FIG. 9 shows the FIA 184 FIG. 8 FME table 230. FME Entry #1 231 comprises elements 1170-1179 and matches frames sent from T1 183 to I1 181. FME Entry #2 232 comprises elements 1180-1189 and matches frames sent from T1 183 to I2 182. FME Entry #3 233 comprises elements 1190-1199 and matches frames sent from I1 181 to T1 183. FME Entry #4 comprises elements 200-209 and matches frames sent from I2 182 to T1 183. FME Entry #5 235 comprises elements 210-15 and matches FIP Ethernet type frames destined for the FIAC 180. FME Entry #6 comprises elements 216-222 and matches FCoE Ethernet type frames destined for the FIAC 180. Elements 1170 1180 1190 200 210 and 216 describe the FIA 184 ingress ports in which to apply the FME entries. Elements 1171 1181 1191 201 211 and 217 describe the Ethernet type field in the received Ethernet frame in which to apply the FME entries. Elements 1176 1186 1196 206 214 221 describe the Vlan identifier and the Vlan PCP field in the received Ethernet frame in which to apply the FME entries. Elements 1172 1182 1192 292 212 218 describe the destination MAC address, symbolically DA_MAC, in the received Ethernet frame in which to apply the FME entries. Elements 1173 1183 1193 203 213 219 describe the source MAC address, symbolically SA_MAC, in the received Ethernet frame in which to apply the FME entries. Elements 1174 1184 1194 204 220 describe, the Fibre Channel destination address identifier, symbolically D_ID, in the embedded Fibre Channel header in the received Ethernet frame in which to apply the FME entries. Elements 1175 1185 1195 205 describe the Fibre Channel source address identifier, symbolically S_ID, in the embedded Fibre Channel header in the received FCoE Ethernet frame in which to apply the FME entries. Elements 1177 1187 1197 207 describes the action which inserts a new Ethernet destination MAC address, symbolically SA_MAC into the received Ethernet frame upon frame matching the previous FME entry elements. Elements 1178 1188 1198 208 describes the action which inserts a new Ethernet source MAC address, symbolically DA_MAC in to the received Ethernet frame upon the frame matching the previous FME entry elements. Elements 1179 1189 1199 209 215 222 describe the egress FIA port to redirect the received Ethernet frame upon the frame matching the previous FME entry elements. Note that not all of the matching elements are required, that only a subset could comprise the FME Entry and still be able to successfully match and forward the frames. For example, the Ethernet type, Vlan identifier, PCP and D_ID match fields are sufficient to match the frame. The existing FIA FIB may be sufficient to forward the frame in lieu of a specific port or port group redirect element.

In FIG. 10 FME entry #7 241 is a lower priority entry in the FIA FME table, i.e., the rule will match if all it's elements match 242 243 244 and none of the other FME entries 231 232 233 234 235 236 match. In FME entries #1 231 #2 232 #3 233 #4 234, elements 1175, 1185, 1195 and 205 may be optional. If the elements are not present, frames will still be forwarded to the appropriate FCoE devices but the check that the correct Fibre Channel source identifier (S_ID) will not be done. Further, the redirect port or port group actions 1179 1189 1199 209 215 222 may also be optional, i.e., the FIB in the FIA FIG. 8 184 can be used to forward the frames.

FIG. 11 shows the function and method to discover which Fibre Channel N_Port identifiers (FCID) are in the same zones as the passed FCID. The tuple containing the Vlan and FCID are passed to the routine 251. The Worldwide Port Name (WWPN) is found by looking up the WWPN in the WWPN/FCID table 252. When the FIAC receives a FTP FLOGI or a FIP NPIV FDISC, the FIAC stores the WWPN from the FIP frame in FIAC storage with the assigned FCID and MAC address. Create a list of zones names for each zone that the WWPN of the passed FCID is 254. For each zone name in the list, another list of zone members in those zones is created 255. For each zone member in this new list, a list of FCIDs excluding the pass FCID is created 256. If the zone name of the passed FCID is not the default zone, then the list of FCIDs in 256 is returned 257 258. If the zone name of the passed FCID is in the default zone then determine the default permission of the default zone 260. FIG. 11 adds an additional default zone permission in addition to PERMIT and DENY, that is AUTOZONE. Autozoning works by taking all ENodes in the default zone and determining whether they are Initiators or Targets. This is accomplished in many ways, either through an administer identifying certain ports on FIAs that are target ports or through discovery in the Name Server table. For example, Initiators may register the FCP FC4 type and may set the Initiator bit in the FC-4 features field, see FC-GS 4. Targets may register the FCP FC4 type and may set the Target bit in the FC-4 features field, see FC-GS-4. The IEEE vendor retrieved from the WWPN could also be used to differentiate Initiators from Targets. Once the Initiators and Targets are discovered, the FIAC will create new zones comprising one initiator and one target per new zone. The result is to create zones for all discovered Initiators and Targets using the best practices one initiator/one target zone method. The discovered Initiators and Targets may not be the already configured zone sets. FIG. 11 uses a case statement to branch to the PERMIT, DENY and AUTOZONE default zone permission states 260. If the default permission is DENY, then no FCIDs are returned 261. If the default permission is PERMIT then all FCIDs in the list are returned 262. If the default permission is AUTOZONE, then from the list of FCIDs, create a new list of target only FCIDs 264. If the passed FCID is in the target only FCID list then return the list of FCIDs that exclude the target FCID list 266 267. This is accomplished by subtracting the Target list from the list of all FCIDs in the default zone, resulting in only the Initiator FCIDs. If the passed FCID is not in the target list, i.e., it is an initiator, then return the list of target FCIDs 268. The get_portids_in_zone function in FIG. 11 allows for previously configured zone sets in addition to an autozoning feature, i.e., autozoning excludes those ENodes which are already defined in zones created manually. Autozoning reduces the steps to configure a network of Initiators and Targets, which is very useful especially in large networks of Initiators. If there are no configured zones in FIG. 12 and autozoning is enabled, the FIAC will create two zones, one zone with members I1 and T1, the other zone with members I2 and T1.

Figure 12:
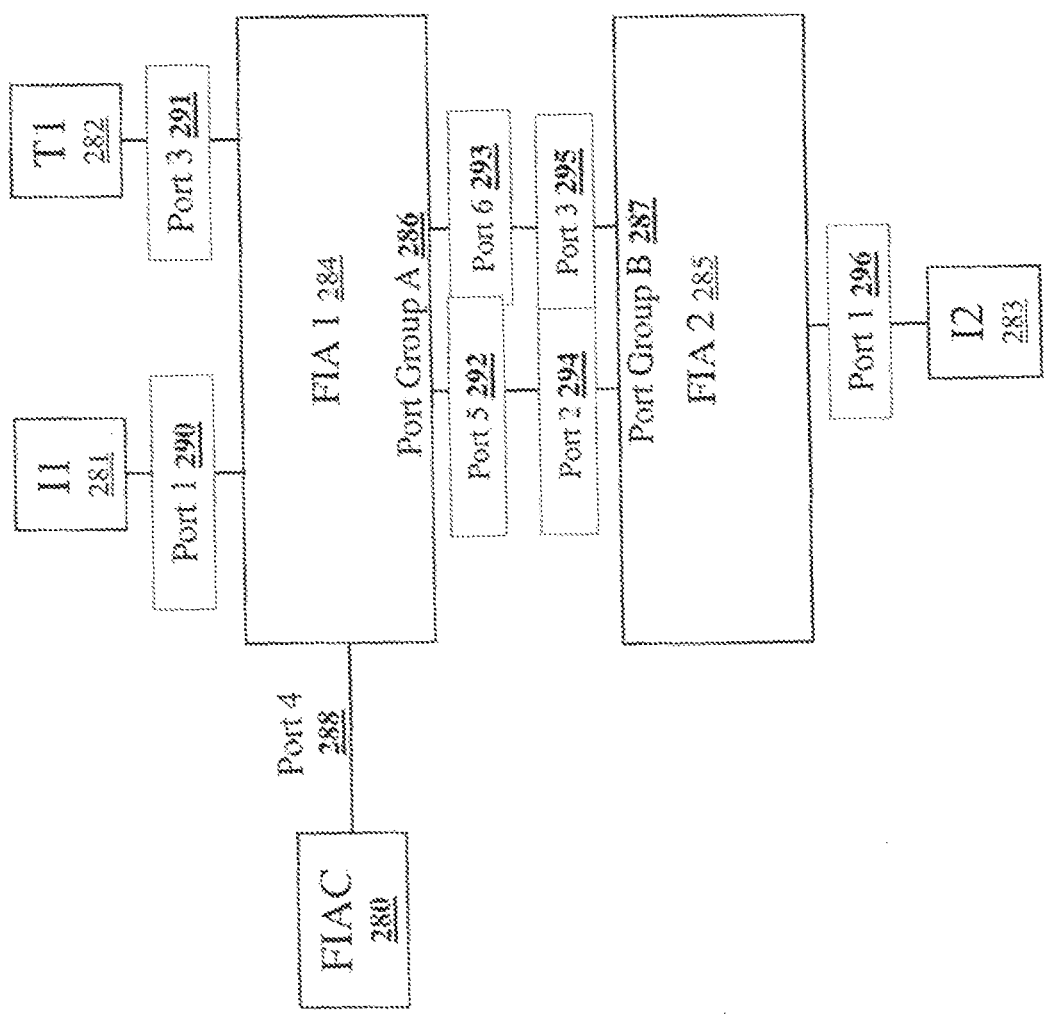
FIG. 12 shows a network with two initiators, two FIAs, one target and a FIAC.

FIG. 12 shows two initiators, one target, two FIAs and single FIAC network. The FIAC 280 is coupled to port 4 288 of FIA 1 284. Initiator I1 281 is coupled to FIA 1 284 through port 1 290. Initiator I2 283 is coupled to FIA2 285 through port 1 296. Target T1 282 is coupled to FIA 1 284 through port 3 291. FIA 1 is coupled to FIA 2 through two links, one through port 5 292 and one through port 6 293. The two links 292 293 form Port Group A 286. FIA 2 285 is coupled to FIA 1 284 through two links, one through port 2 294 and one through port 3 295. The two links 294 295 form Port Group B 287. The Port Groups, Port Group A 286 and Port Group B 287 may be LAG groups.

FIG. 13 shows the FME table 300 in FIA 1 FIG. 12 284. FME Entry #1 301 describes the rules that match frames sent from T1 FIG. 12 282 to I1 FIG. 12 281. FME Entry #2 302 matches frames sent from I1 to T1. FME Entry #3 303 matches frames sent from I2 to T1. Entry #4 304 matches frames with the Ethernet destination MAC address equal to the FIAC MAC address, symbolically FCF_MAC 342 and with the Ethernet type of FIP type 341. FME Entry #5 305 matches FCoE frames destined to the FIAC fabric services. FME Entry #6 306 denies all other frames not matched by FME Entries #1 301, #2 302, #3 303, #4 304, and #5 305. FME Entry #6 is of a lower match priority from the rest of the FME entries, i.e., it will only match if it's elements match 360 361 and none of the other FME entries match. In FME entries 301, #2 302, #3 303, #4 304, and #5 305, not all the elements are necessary. For example, the DA_MAC and SA_MAC elements may be absent and the frame will still be matched using the other march elements. The action elements to redirect the frame to a specific port 316 329 339 345 356 could be absent thereby depending on the FIA's FIB table to forward the frames.

FIG. 14 shows both the network, i.e., FIA 1 FIG. 12 284 and FIA 2 FIG. 12 285, zoning table 400 and FIA 2 FIG. 12, 285 FME Table 410. The network zoning table 400 shows the active zone set comprising zones that comprised of zone members. Zone 1 contains two zone members 401 403. Zone member 401 comprises the Worldwide Port Name (WWPN) of I1, symbolically WWPN-I1 and zone member 403 comprises the WWPN of T1, symbolically WWPN-T1. Zone 1 therefore comprises I1 and T1. Zone 2 contains two zone members 402 and 404. Zone member 402 comprises the WWPN of I2, symbolically WWPN-I2 and zone member 404 comprises the WWPN of T1, symbolically WWPN-T1. Zone 2 therefore comprises I2 and T1. In this zone table all zone members belong to the Vlan identifier 100 and a PCP of 3. The zone table represents best practices in separating initiators and pairing initiators with targets in their own zone.

The FIA 2 FME table 410 FIG. 14 comprises two FME entries 411 412. FME Entry #1 411 matches frames sent from T1 to I2 and FME Entry #2 matches frames sent from I2 to T1. Note that in FME Entry #2 412, there exists the capability of forwarding over a predefined Port Group. The Port Group could be a LAG group or any other method for coupling multiple ports together, e.g., TRILL, Port Bonding, etc.

Figure 15:
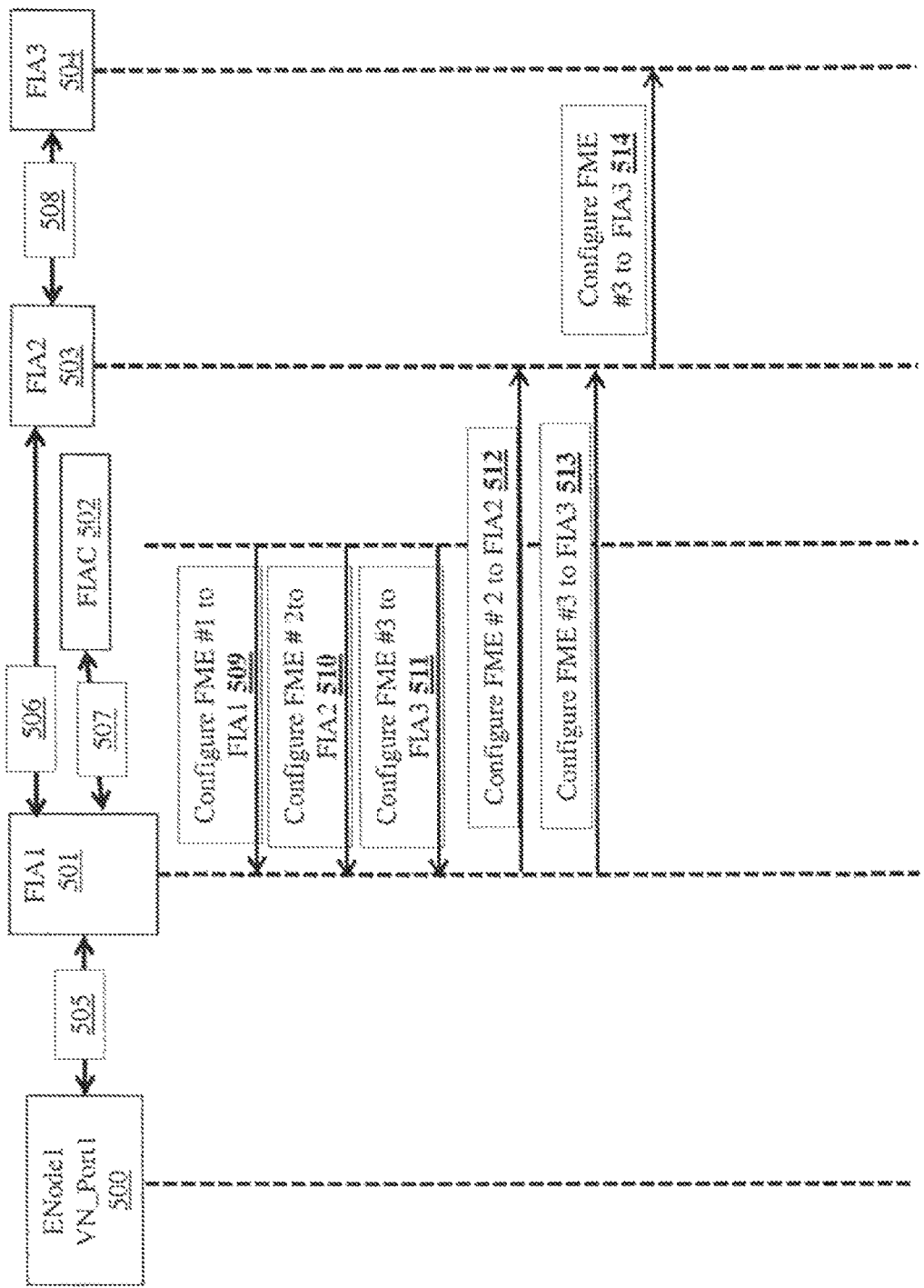
FIG. 15 is a diagram showing the configuring of multiple FIA FMEs by a FIAC.

FIG. 15 is a diagram showing the configuring of multi-FIA 501 503 504 FMEs by an FIAC 502. The FIAC can configure FIA FME's in response to the receipt FIP FLOGI or FIP NPIV FDISC frames or can preconfigure FME's to be used by the FIAC when receiving FIP FLOGI or FIP NPIV FDISC frames at a future time. The FIAC may be removed the FME's when a FIP LOGO is received from an ENode 500. When preconfiguring the FME's 509 510 511 the FIAC 502 may assign one or more of the following elements in the configure FME command: FIAC 502 MAC address, Vlan identifier and PCP to match, Ethernet source MAC address to match, Ethernet destination MAC address to match, Fibre Channel N_Port source and/or destination address identifier to match, ingress FIA port or port group to match, Ethernet source and/or destination MAC addresses to substitute in the received Ethernet frame, port or port group to forward the received frame to. The FIA assigns both the MAC and Fibre Channel N_Port address identifiers when instantiating VN_Ports upon the receipt of FIP FLOGI and/or FIP NPIV FDISC frames from an ENode. The method for assigning the addresses can be flexible and can take in consideration the FIA, the number of ports in the FIA and other such information. For example, the FIAC can assign a certain range of Fibre Channel address identifiers to each FIA thereby allowing the matching of a field in the address identifier to the specific FIA. This field can be the domain part of the address or use multiple fields and subfields for identifying the FIA. Once the addresses are assigned the FIAC builds a frame that contains the fields needed for the FIA to create an FME. The FIAC can send the data to build the FME either through an SNMP frame if a MIB is defined with the appropriate fields, or an FIA telnet or SSH session that accesses the FIA command line interface (CLI), or through the OpenFlow protocol or any other means to communicate the FME to the FIA. Referring to FIG. 15, the FIAC 502 sends configure FME commands 509 510 511 to FIA1 501, FIA2 503 and FIA3 504. This represents a multi-FIA configuration of ENode end-to-end interconnection, configured by the FIAC 502.

Figure 16:
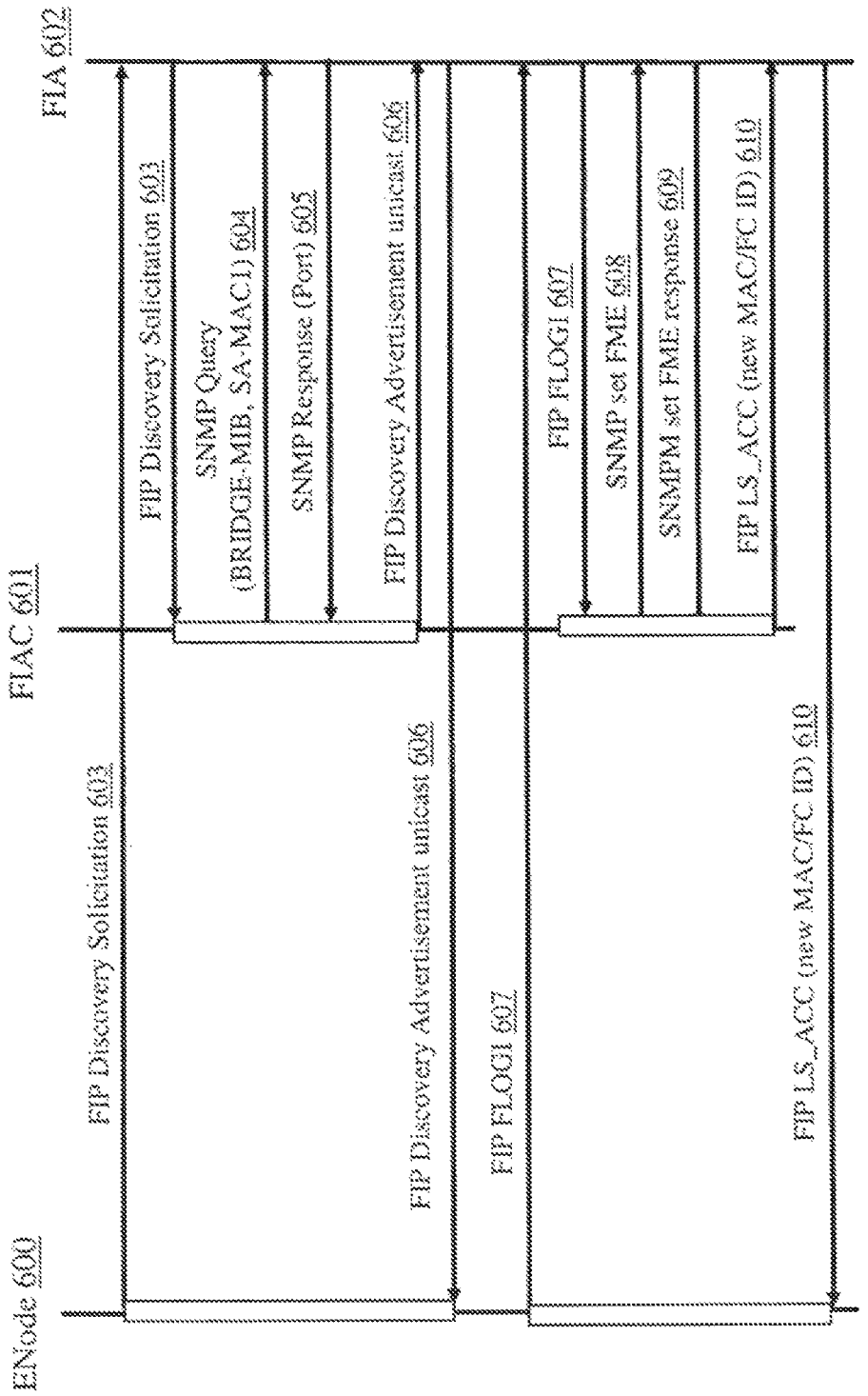
FIG. 16 is a diagram showing the discovery of an ENode FIA port and the sequence of setting of an FME in the FIA.

FIG. 16 is a diagram showing the discovery of an ENode FIA port and the sequence of setting of an FME in the FIA. ENode 600 transmits a FIP Discovery Solicitation frame 603 through FIA 602 to the FIAC 601. The FIAC 601 may send an SNMP request containing the source MAC address from the FIP Discovery Solicitation frame 603 to the FIA 602. The FIA processes the request and responds with an SNMP response 605 containing the port in which the ENode MAC address is connected. If the FIA FME contains an action to redirect the received frame to a specific port, the SNMP BRIDGE-MIB request/response sequence will discover the port. This sequence may also be initiated at any time after receipt of the FIP Discovery Solicitation frame including upon receipt of a FIP FLOGI frame from an ENode. When the ENode 600 transmits a FIP FLOGI frame 607 to the FIAC 601 and the FIA does not contain an FME for this ENode, the FIAC 601 will transmit an SNMP set FME request 608 to the FIA 602. The SNMP set FME request may utilize a private MIB. FIA 602 will create and add an FME into its FME table and respond with an SNMP set FME response 609. The FIAC 601 receives the SNMP response and will then transmit a FIP LS_ACC to the FLOGI 610 back to the ENode 600. It should be noted that the FIAC 601 can also utilize a CLI over a Telnet or SSH session, Openflow, or any other protocol to query the FIA BRIDGE-MIB and set FME's in lieu of using SNMP.

Figure 17:
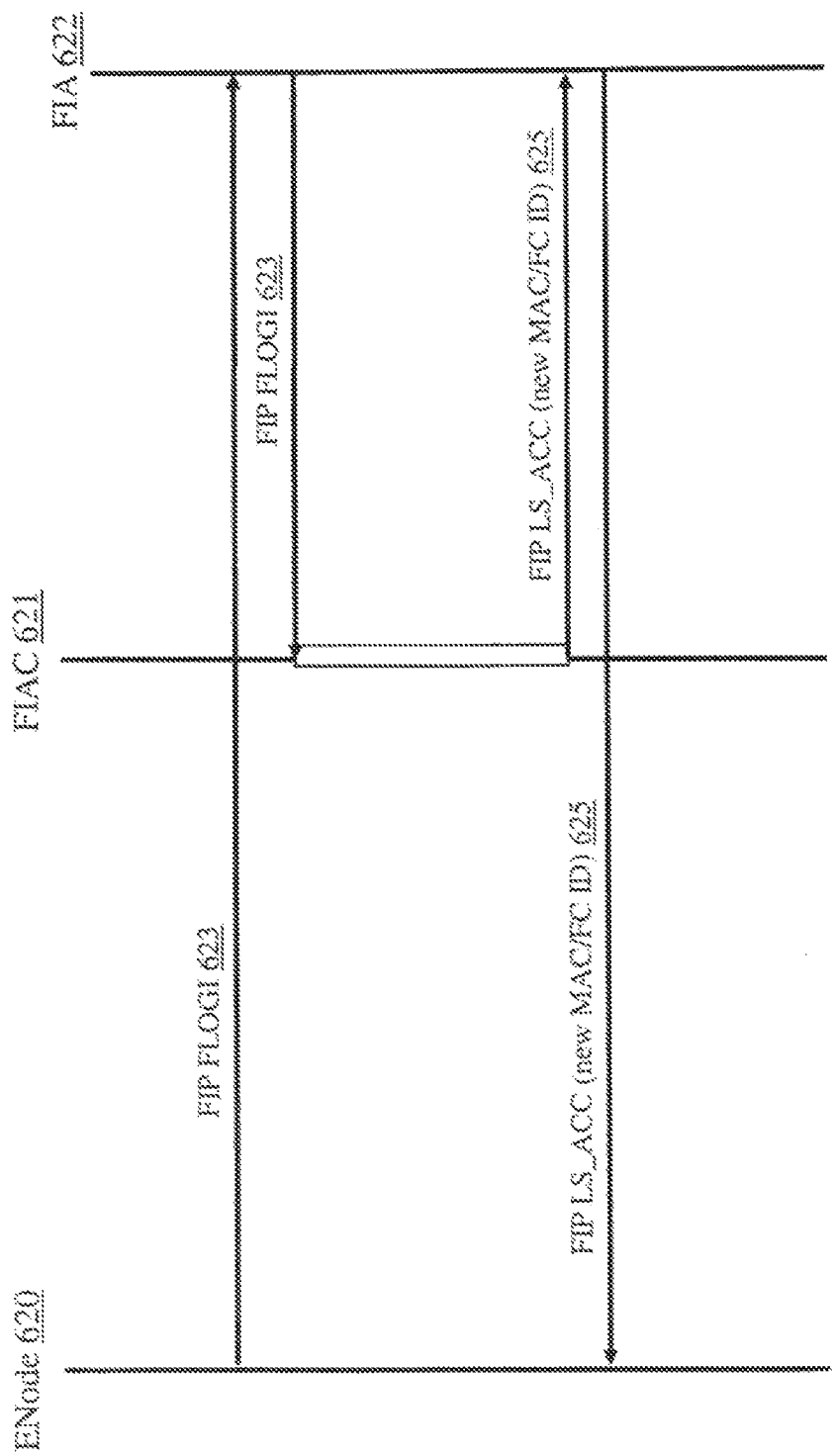
FIG. 17 is a diagram showing the sequence of receiving a FIP FLOGI frame when a free FME was previously configured by the FIAC.

FIG. 17 is a diagram showing the sequence of receiving a FIP FLOGI frame when a free FME was previously configured by the FIAC. ENode 620 transmits a FIP FLOGI to the FIA 622 which forwards the FIP FLOGI to the FIAC 621. FIA 622 may forward the FIP FLOGI frame using it's FIB table. If the FIAC 621 has previously set at least one FME in the FIA 622, and that FME entry is free to use, the FIAC 621 may use the FME for the incoming FTP FLOGI frame. FIAC 621 may use the Fibre Channel N_Port identifier (FCID) and MAC that was previously set FME in the FIA 622 to create the FIP LS_ACC response 625 to the FIP FLOGI. The FIAC 621 transmits the FIP LS_ACC response 625 to the FIA 622 which forwards the FIP LS_ACC response 625 to the ENode 620. When the FIAC 621 preallocates the FME, it minimizes the communications between the FIAC 621 and the FIA 622.

Figure 18:
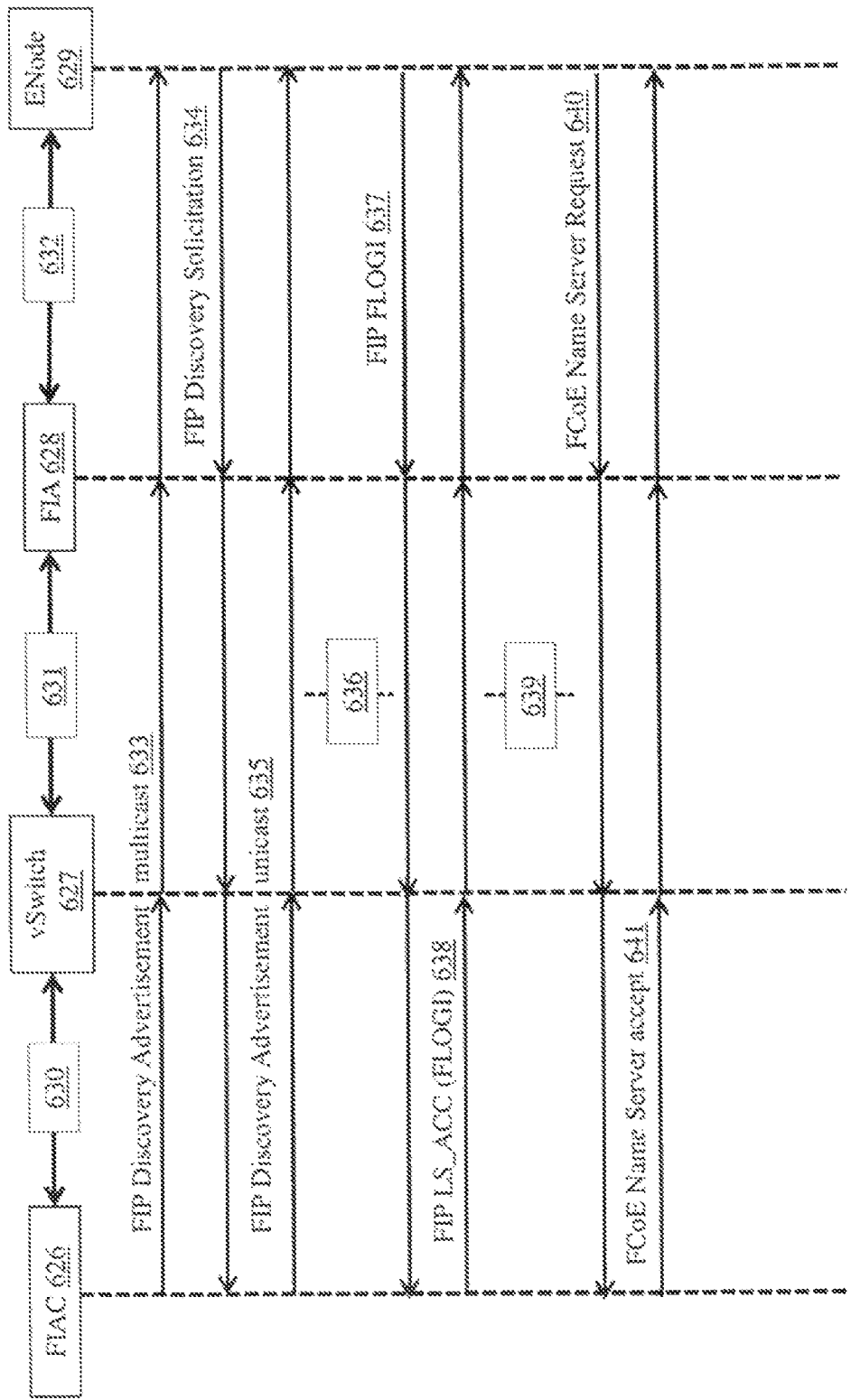
FIG. 18 is a diagram showing the communication between a FIAC virtual machine and an ENode.

FIG. 18 is a diagram showing the communication between a FIAC virtual machine 626 and an ENode 629. The FIAC 626 is coupled 630 to a virtual switch or vSwitch 627. The vSwitch is coupled to a physical NIC (not shown) which is coupled 631 to an FIA 628. The FIA 628 is coupled 632 to an ENode 629. The diagram shows the FIP Discovery Advertisement 633 and FIP Discovery Solicitation protocol 634 between the FIAC 626 and ENode 629. The diagram also shows the FIP FLOGI 637, FIP LS_ACC 638 protocol frame exchange between the FIAC 626 and ENode 629. Also shown is the ENode 629 to FIAC 626 FCoE Name Server request 640 and accept 641. The Name Server commands may comprise one of more of the Name Server commands listed in the ANSI T11 FC-GS specification. The dotted lines 636 and 639 indicate that other FIP and FCoE frame exchanges can occur between the FIAC 626 and the ENode 629 which may include FCoE PLOGI to Well Known fabric services supported by the FIAC, state change registration and accept and others known to those skilled in the art.

Figure 19:
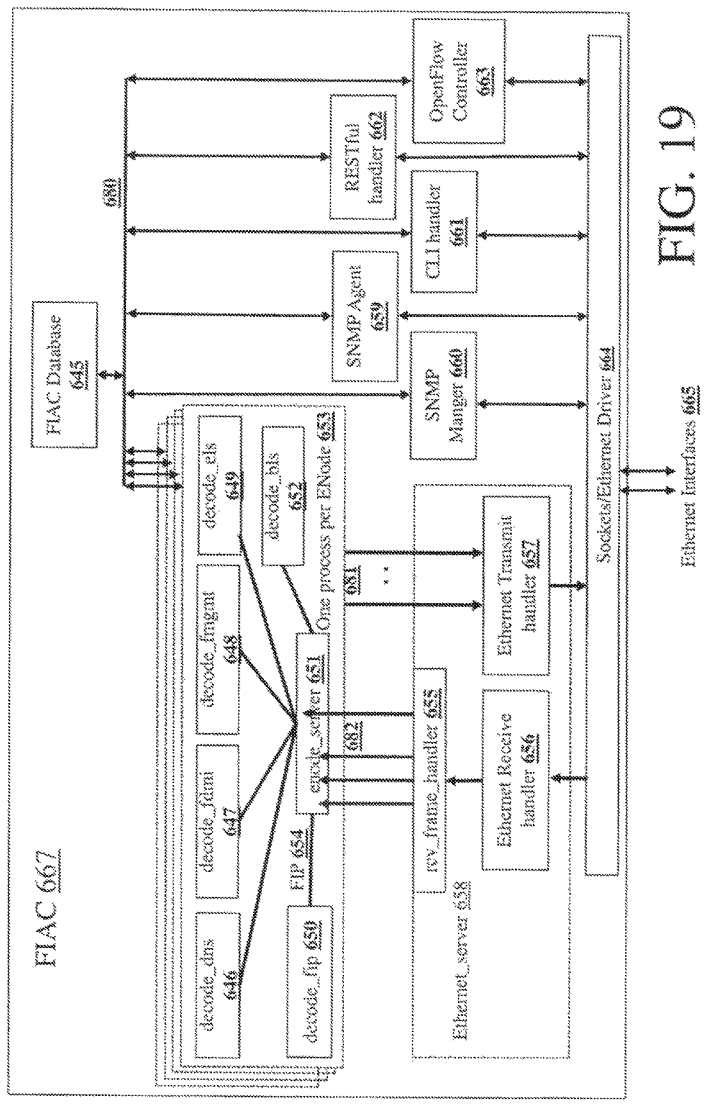
FIG. 19 shows a block diagram of one implementation of the FIAC.

FIG. 19 shows a block diagram of one implementation of the FIAC 667. The FIAC 667 is coupled to one or more Ethernet networks through Ethernet interfaces 665. The Ethernet interfaces 665 may include interfaces to different networks identified by different Vlan identifiers and PCP values. The FIAC communicates over the Ethernet networks using a socket architecture 664 supported by the FIAC host operating system. Attached to the socket interface and Ethernet driver 664 are raw Ethernet transmit 657 and Ethernet receive 656 handlers. The word "raw" indicates that the Ethernet type fields that are sent and received may include FIP Ethernet type, FCoE Ethernet type or LLDP Ethernet type. There may be one or more Ethernet receive handlers 656, one for each Ethernet interface. The Ethernet frame handers receive the FIP and FCoE Ethernet frame types and forward them to the Ethernet Receive Frame Handler (rcv_frame_handler 655). The rcv_frame_handler 655 forwards the frame to the appropriate enode_server 651. There is one enode_server 651 process for each ENode FCoE Controller MAC and VN_Port MAC pair and one enode_server for every additional instantiated VN_Port from the receipt of a FIP NPIV FDISC frame. The enode_server 651 receives frames from the rcv_frame_handler 655, decodes the frame and then calls the appropriate frame processing function. The frame processing functions include decode_fip 650 for decoding received FIP frames, decode_dns 646 for processing Name Server FCoE frames, decode_fdmi 647 for processing Fabric Device Management Interface frames, decode_fmgmt 648 for processing Fabric Configuration Management Server frames, decode_els 649 for processing FCoE Extended Link Services frames and decode_bls 652 for processing FCoE Basic Link Services frames. The enode_server 651 may process all other frames that don't match the previous decoding functions. The enode_server block 653 is coupled to the FIAC database 645. The FIAC database 645 contains storage for storing the Simple Name Server Table (in additional to other fields, comprising one or more of the following: the Worldwide Port and Node names, FC-4 Type, FC-4 features, symbolic Port and Node names, Fabric Port name, Hard Address, Permanent Port name, Fibre Channel Port identifier), the zoning database, FDMI and FMGMT data, SNMP MIBs, data structures in support of managed FIAs (including FME information), as well as other FIAC needed information, state and log information. The FIAC database 645 also contains database "triggers", which allow processes such as the enode_server 651, SNMP manager 660, SNMP agent 659, CLI handler 661, RESTful handler 662, OpenFlow controller 663 and other modules not shown to be notified upon database table or record changes. This allows the different FIAC servers, modules, managers and agents to indirectly communicate changes in the FIAC Database. An example would be the change in an FIAC configuration parameter created by a administrator through the CLI server 661. The CLI server 661 would update the FIAC Database record 645. The running enode_server processes would be notified of the FIAC Database 645 record change if they subscribed to changes in that specific record. This simplifies the communication between FIAC 667 servers, modules, managers and agents. The FIAC 667 comprises an SNMP Manager 660 which functions to initiate SNMP requests. An example use may be the FIAC 667 setting and clearing FME's from FIAs. The FIAC 667 comprises an SNMP agent 659 to support both public and private MIBs. The FIAC 667 supports a CLI handler 661 to allow a network manager to access FIAC configuration and statistics data. The CLI handler 661 may also support the setting and clearing of FME's in FIAs. The FIAC 667 comprises a RESTful handler 662, which functions as an interface to web clients to manage the FIAC 667. The FIAC 663 comprises an OpenFlow Controller 663, which may function to set and clear FME's in FIAs. The FIAC 667 may also be implemented in a bare metal server, i.e., a server that is not virtualized, and run as a process in the server's resident operating system.

Figure 20:
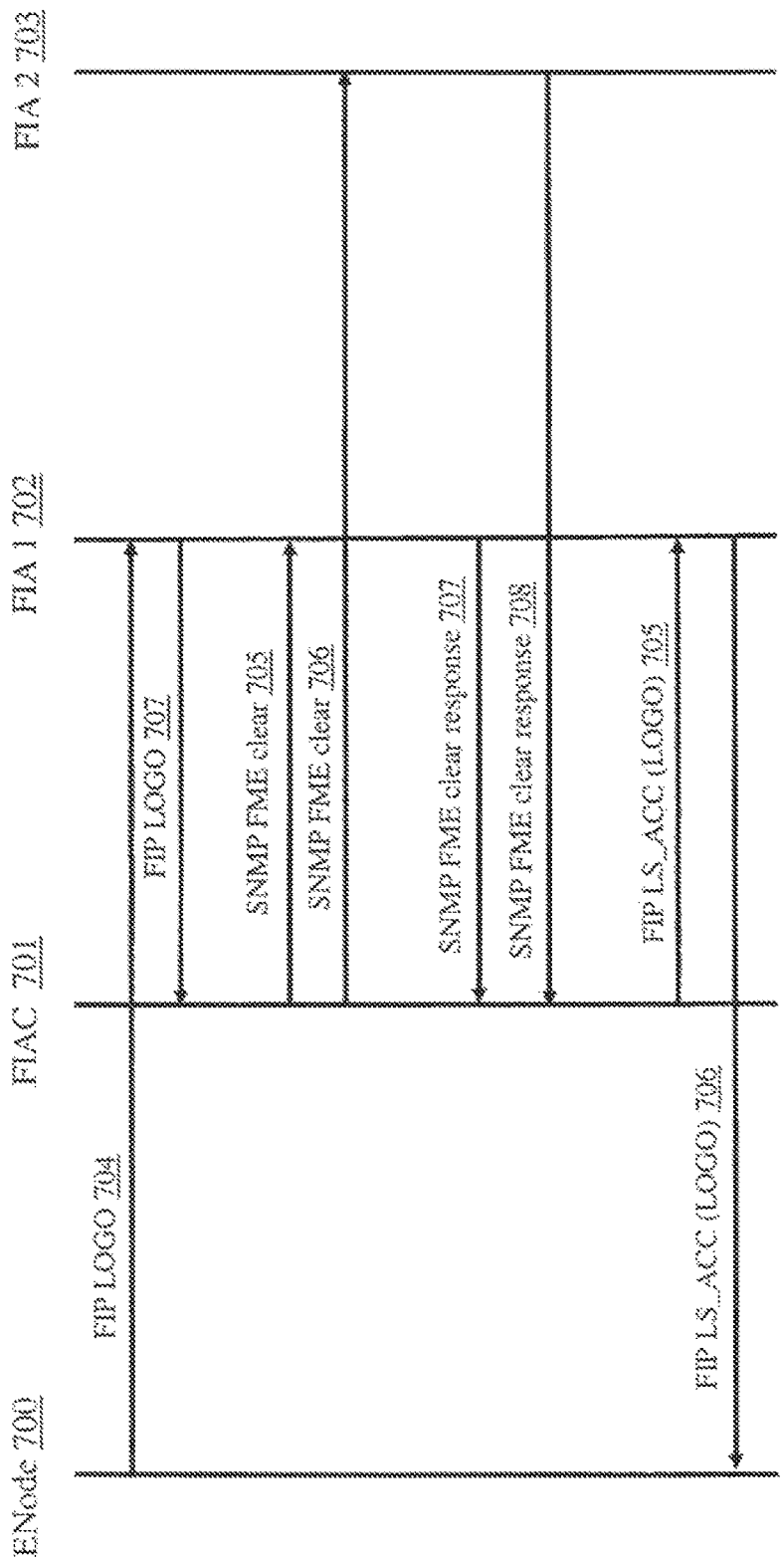
FIG. 20 is a diagram showing the removal of FIA FME's upon the FIAC receipt of a FIP LOGO frame.

FIG. 20 is a diagram showing the removal of FIA FME's upon the FIAC receipt of a FIP LOGO 704. ENode 700 transmits a FIP LOGO 704 to FIA 1 702, in which it is directly connected. FIA 1 702 forwards the FIP LOGO frame 707 to FIAC 701. In this example both FIA 1 702 and FIA 2 703 contain FME entries for the ENode 700. FIAC 701 transmits an SNMP FME clear request 705 to FIA 1 702 and an SNMP FME clear request 706 to FIA 2 703. The SNMP request may be described by a private MIB definition. FIA 1 702 removes the FME from its FME table and responds with an SNMP FME response 707 frame. FIA 2 703 removes the FME from its FME table and responds with an SNMP FME response 708 frame. FIAC 701 responds to the FIP LOGO with an FIP LS_ACC to the LOGO frame 705. FIA 1 702 receives the FIP LS_ACC frame 705 and forwards the FIP LS_ACC frame 706 to the ENode 700. The SNMP protocol can be replaced by any other means to communicate to the FIAs including Telnet/SSH, OpenFlow or other FIAC to FIA protocols.

Figure 21:
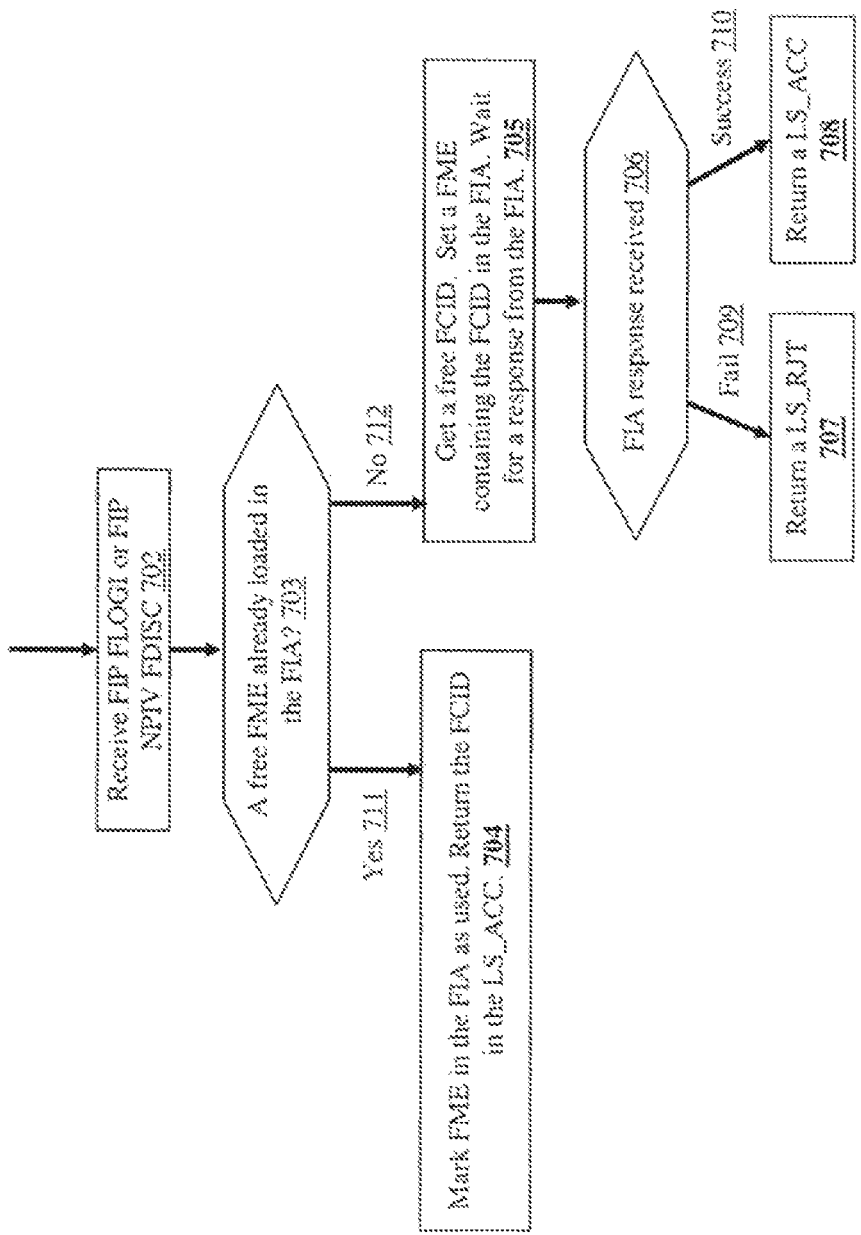
FIG. 21 is a diagram showing the receipt of a FIP FLOGI or FIP NPIV FDISC frame and a subset of actions by the FIAC.

FIG. 21 is a diagram showing the receipt of a FIP FLOGI or FIP NPIV FDISC frame and some associated actions by a FIAC. A FIP FLOGI frame or FIP NPIV FDISC frame is received by the FIAC 702. The FIAC determines whether there is a free FME entry in the FIA 703. This indication can come from a table resident on the FIAC which keeps track of free FIA FME entries. If a free 711 FME entry exists, the FIAC uses the Fibre Channel N_Port identifier from the FME to insert into the FIP LS_ACC frame 704. The FIAC also marks that free FME entry as used. If a free FME entry does not exist 712, the FIAC allocates a Fibre Channel N_Port identifier and communicates it to the FIA to create an FME entry 705. When the FIAC receives a successful response from the FIA indicating that an FME entry was successfully added 710 to the FIA FME table, the FIAC returns a LS_ACC to the FIP FLOGI or FIP NPIV FDISC frame 708. If the FIAC receives a failure response, e.g., a timeout or a FIA FME table full condition, the FIAC will return a FIP LS_RJT to the FIP FLOGI or FIP NPIV FDISC frame.

Figure 22:
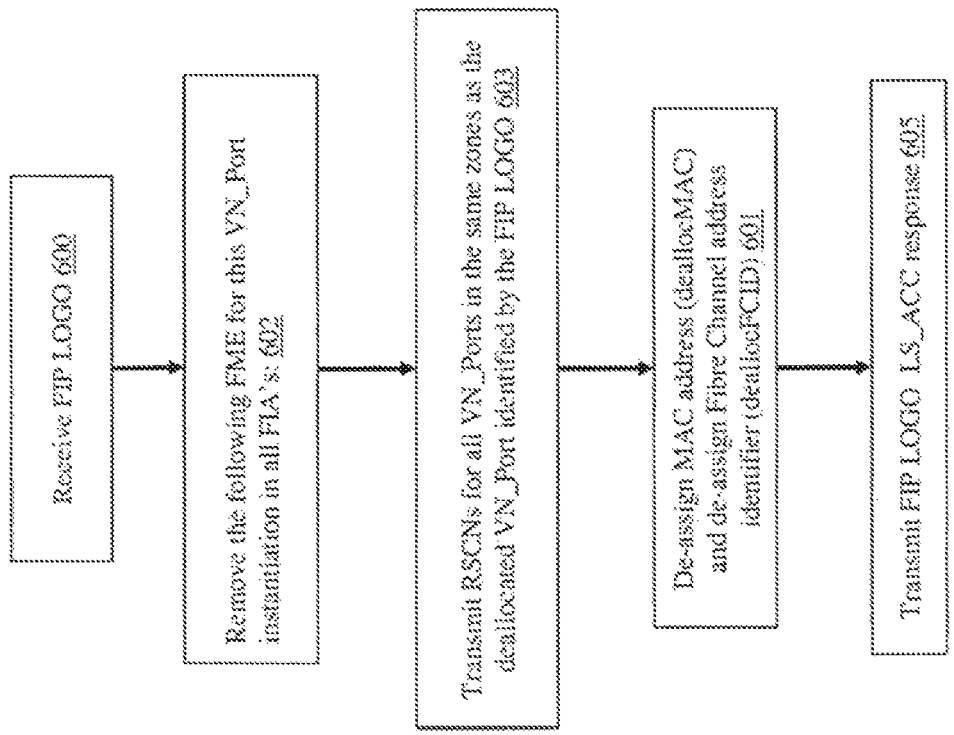
FIG. 22 is a diagram showing the removal of one or more FMEs upon the receipt of a FIP FLOGO frame from an ENode.

FIG. 22 is a diagram showing the removal of one or more FMEs upon the receipt of a FIP FLOGO frame from an ENode. The FIAC receives a FIP FLOGO frame 600. The FIAC communicates with all the FIA's which have an FME for this address 602. The FIAC transmits RSCN frames to all VN_Ports in the same zones as the VN_Port in the FIP LOGO frame 603. The FIAC de-assigns or frees the specified MAC address and specified Fibre Channel address identifier, 601. The FIAC then transmits a FIP LS_ACC response to the FIP LOGO 605.

Figure 23:
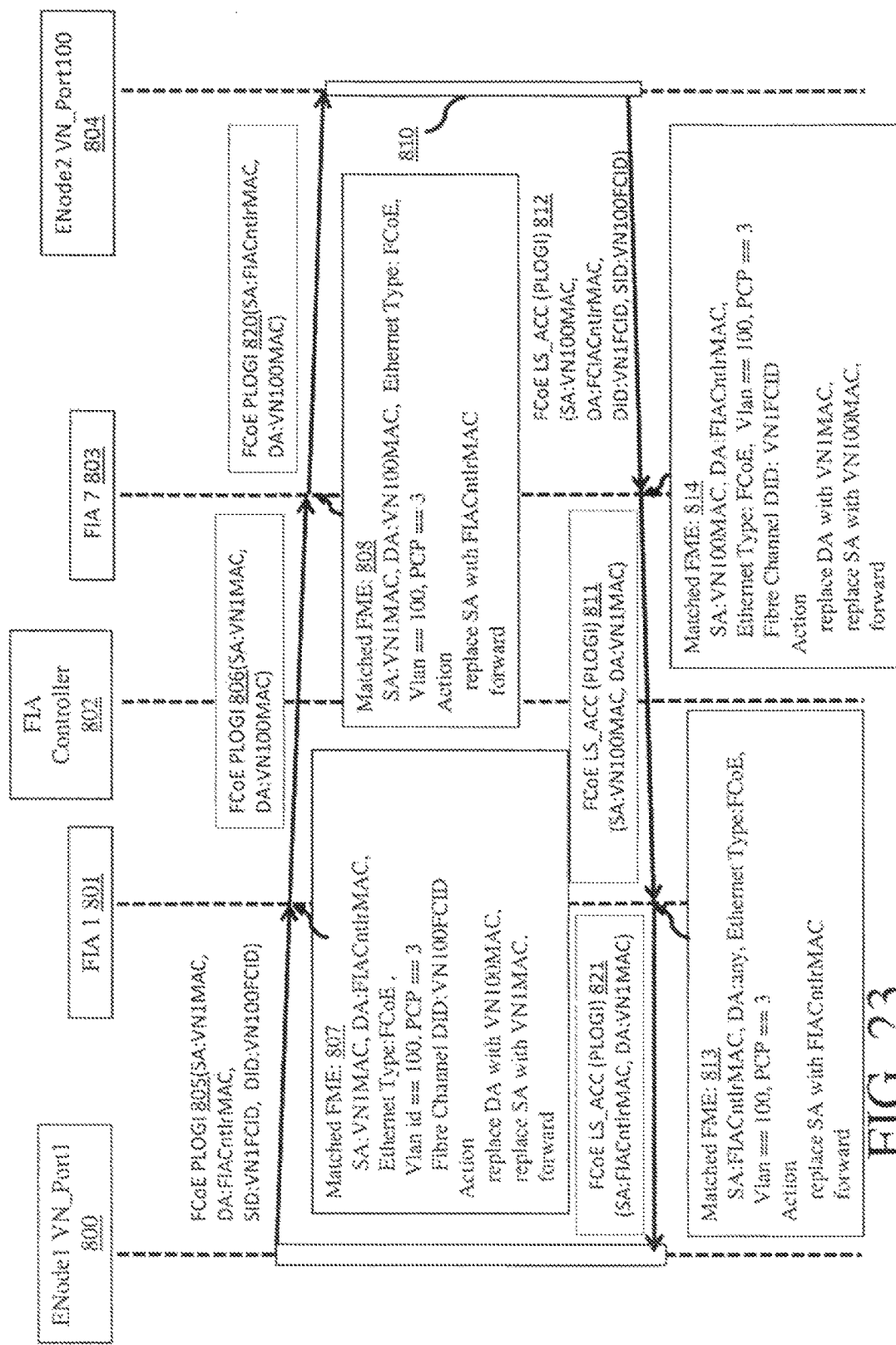
FIG. 23 is a sequence diagram showing a PLOGI exchange between ENodes.

FIG. 23 is a sequence diagram showing a PLOGI exchange between ENodes. VN_Port1 of ENode1 800 transmits a FCoE PLOGI request 805 with a source Ethernet MAC address of the VN_Port1 (VN1MAC), a destination Ethernet MAC address of the FIA Controller 802, a Fibre Channel source address identifier (SID) of VN_Port1 (VN1FCID), and a Fibre Channel destination address identifier (DID) of VN_Port100 (VN100FCID) contained in ENode2 804. FIA1 801 matches the frame with the FME 807 match fields comprising the source and destination Ethernet MAC addresses of any (or optionally the source Ethernet MAC address of VN_Port1, i.e., VN1MAC, and the destination Ethernet MAC address of the FIAC controller MAC, symbolically FIACntlrMAC), the Ethernet Type of FCoE, the Vlan identifier, in this example 100, the Vlan PCP, in this example 3, the Fibre Channel destination address identifier (DID) of VN_Port100, symbolically VN100FCID. The action is to replace the destination Ethernet MAC address with VN_Port100's MAC address, symbolically VN100MAC, the source Ethernet MAC address with the ENode 2 VN_Port100 MAC address, symbolically VN200MAC, and to forward the frame. The frame is forwarded to FIA 7 803. Note that once the FIP sequence is complete and the frames are not destined for Fabric Services Well Known addresses, the FIA Controller 802 is not involved in forwarding the FCoE frames that are not destined to Well Known Fabric Services addresses (i.e. where the Fibre Channel destination address is FF.FF.xx. where xx is don't care). FIA 7 803 receives the FCoE PLOGI frame and forwards the frame based on the previously assigned FME 808 comprising the matching Fields of source Ethernet MAC address of the ENode 1 VN_Port1 800 MAC, symbolically VN1MAC (or optionally any source MAC), a destination Ethernet MAC address the ENode 2 VN_Port 100 MAC 804, symbolically VN100MAC (or optionally any destination MAC), an Ethernet Type of FCoE, a Vlan identifier, in this example 100, a Vlan PCP, in this example 3 and the action is forward the frame. Optionally the action can include a port or LAG/MLAG group to forward the frame too. VN_Port100 of ENode2 804 receives the FCoE PLOGI, processes it 810, and responds with a FCoE LS_ACC to the PLOGI 812. The FCoE LS_ACC includes a destination Ethernet MAC address of the FIA Controller FCF-MAC address, symbolically FIACntlrMAC, a source Ethernet MAC address of VN_Port100, symbolically VN100MAC, a Fibre Channel destination address identifier (DID) of VN_Port1, symbolically VN1FCID, and a Fibre Channel source address identifier if VN_Port100, symbolically VN100FCID. FIA 7 803 uses the previously assigned FME 814 comprising the match fields of source Ethernet MAC address of the ENode 2 VN_Port 100 MAC 804, symbolically VN100 AC (or optionally any source mac), a destination Ethernet MAC address the FIAC 802, symbolically FIACntlrMAC (or optionally any source mac), the destination Fibre Channel address identifier (DID) of VN_Port1, symbolically VN1FCID, and the Ethernet Type of FCoE, a Vlan identifier, in this example 100, a Vlan PCP value, in this example 3, and with an action to replace the destination Ethernet MAC address with VN_Port1's MAC address, symbolically VN1MAC, replace the source Ethernet MAC address with the ENode 1 VN_Port 1 MAC 800. symbolically VN1MAC, and forward the frame. The frame is forwarded FIA 1 801 which matches the frame with the FME 813 comprising the match fields of the source Ethernet MAC address of the ENode 2 VN_Port 100 804, symbolically VN100MAC, the destination Ethernet MAC address of ENode 1 VN_Port1 800, symbolically VN1MAC, the Ethernet Type of FCoE, a Vlan identifier, in this example 100, a Vlan PCP value, in this example 3, with an action to forward the frame. Optionally the source and/or the destination Ethernet MAC addresses can be to match any MAC address. The replacement of the source MAC addresses in the first FIA hop to the sending ENode allows the transition FIAs, i.e., the FIAs in the path except the last or egress FIA, to learn the MAC address and add it to their FIBs. This allows the forwarding Ethernet network of FIAs to use existing layer 2 forwarding methods (e.g., STP, MSTP, Trill, SPB, etc.) as well as bunking architectures such as LAG, MLAG, etc. to forward the FCoE frames.

Figure 24:
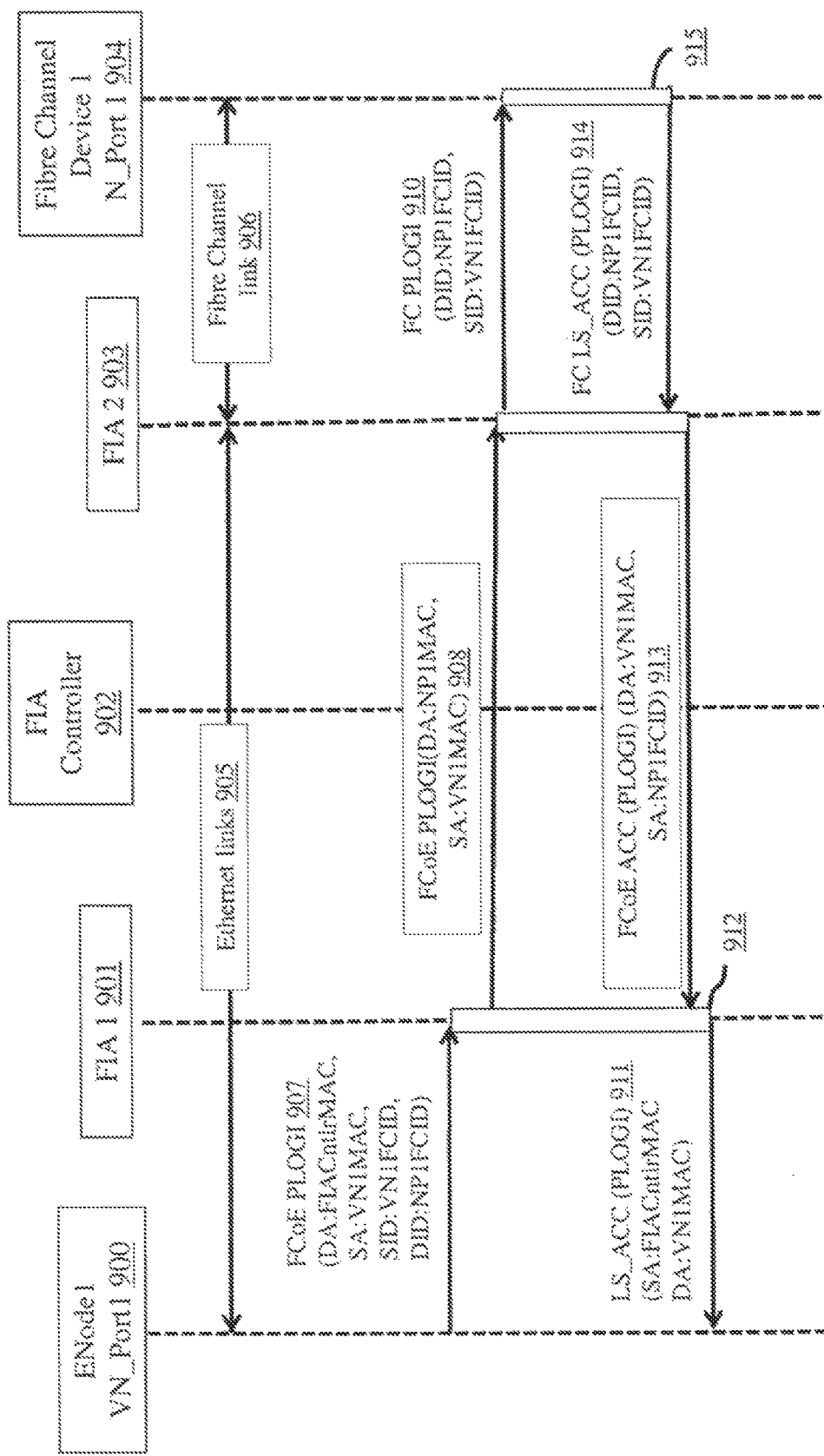
FIG. 24 is a sequence diagram showing the communication between a ENode and a Fibre Channel Device through FIAs.

FIG. 24 is a sequence diagram showing the communication between a ENode 900 and a Fibre Channel Device 904 through two FIAs 901 903. The connections between the ENode1 900, the FIA 1 901, the FIA Controller 902, and at least one port in FIA 2 903 are Ethernet connections 905. The connection between FIA 2 903 and the Fibre Channel Device 904 is a Fibre Channel connection 906. VN_Port1 in ENode 1 900 transmits an FCoE PLOGI request 907 frame comprising the source Ethernet MAC address of VN_Port1, symbolically VN1MAC, destination Ethernet MAC address of the FIAC, symbolically FIACntlrMAC, a destination Fibre Channel address identifier (DID) assigned to N_Port1, symbolically NP1FCID, and a source Fibre Channel address identifier (SID) assigned to VN_Port1, symbolically VN1FCID. FIA 1 901 receives the frame, replaces the source Ethernet MAC address with the ENode1 VN_Port1 900 MAC address, symbolically VN1MAC, replaces the destination Ethernet MAC address with the assigned Fibre Channel Device 1 N_Port MAC address, symbolically NP1MAC, then forwards the frame 908 to FIA 2 903. FIA 2 903 receives the frame, decapsulates the frame (i.e., removes the layer 2 Ethernet and FCoE headers) into a Fibre Channel frame 910 and transmits the Fibre Channel PLOGI frame 910 to Fibre Channel Device 1 N_Port 1 904. Fibre Channel Device 1 N_Port1 904 processes the N_Port PLOGI frame and responds with a Fibre Channel LS_ACC frame to the PLOGI frame 914. FIA 2 903 receives the frame and encapsulates it into a FCoE LS_ACC frame, then transmits the frame 913 to FIA 1 901. FIA 1 901 receives the frame from FIA 2 903. As part of encapsulating a Fibre Channel frame to an FCoE frame, FIA 2 903 inserts both source and destination MAC addresses. The source MAC address is the assigned MAC address to Fibre Channel Device 1, symbolically NP1FCID, and the destination MAC address is the address of ENode1, symbolically VN1MAC. FIA 1 receives frame 913, substitutes the Ethernet source MAC address to the FIAC MAC address, symbolically FIACntlrMAC, and substitutes the Ethernet destination MAC address to ENode1 MAC address, symbolically VN1MAC.

Figure 25:
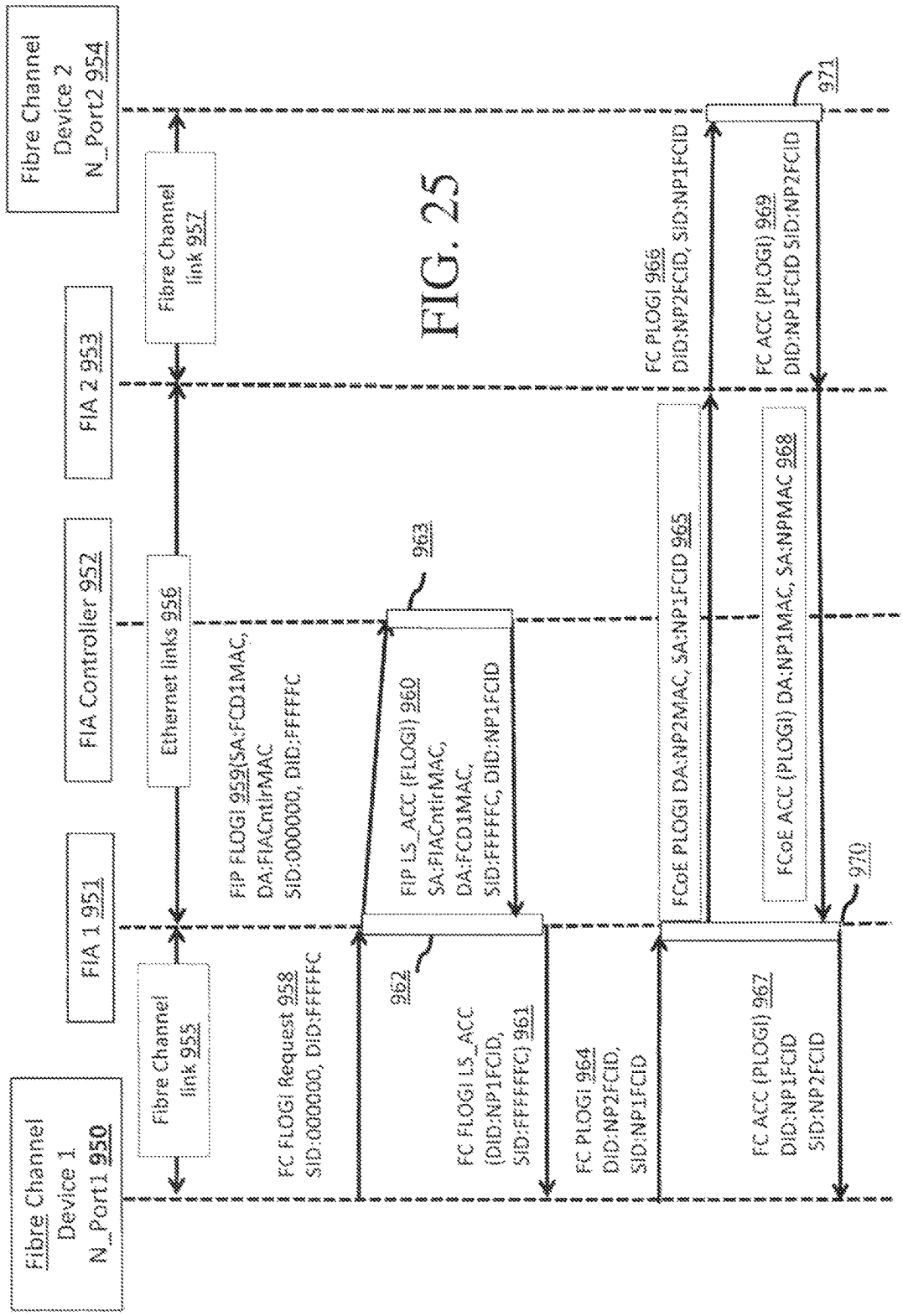
FIG. 25 is a sequence diagram showing the interconnection of two native Fibre Channel devices through two FIAs, the FIAs comprising ports adapted to connect to Fibre Channel devices.

FIG. 25 is a sequence diagram showing the interconnection of two native Fibre Channel devices through two FIA 951 952, the FIA comprising ports adapted to connect to Fibre Channel devices 955 957. FIA 1 951 and FIA 2 953 comprise ports adapted to connect to Fibre Channel devices 950 954. FIA 1 951 and FIA 2 953 also comprise ports adapted to connect to an Ethernet network 956. Fibre Channel Device 1 950 transmits a Fibre Channel FLOGI request frame 958 to FIA1 951. The Fibre Channel FLOGI frame includes a Well Known destination Fibre Channel address identifier of the well known Directory Server address identifier (FFFTFCh), which Is a Fibre Channel fabric service implemented within the FIAC 952. FIA 1 951 receives the Fibre Channel FLOGI frame, encapsulates it into a FCoE frame comprising an assigned source Ethernet MAC address of the Fibre Channel Device, symbolically FCD1MAC, and destination Ethernet MAC address of the FIAC 952 FCF-MAC address, symbolically FIACntlrMAC. A Fibre Channel Device MAC address is assigned by the FIA Controller (FIAC) 952 to the Fibre Channel Device 950 and represents a virtual FCoE_Controller MAC address to identify it on the Ethernet network. This MAC address is set in the FIAs in the FCoE encapsulation apparatus and is only used internally for frames between FIAs 951 953 and between the FIAs and the FIAC 952. FIA 1 951 forwards the FCoE encapsulated Fibre Channel FLOGI frame 959 to the FIAC 952 over the Ethernet network. The FIAC 952 services the frame 963 and returns a FIP LS_ACC response frame 960 comprising the source Ethernet FCF-MAC address of the FIAC 952, symbolically FIACntlrMAC, the destination Ethernet MAC address of the Fibre Channel Device 950, symbolically FCD1MAC, the source Fibre Channel address identifier of the well known Directory Server address identifier (FFFFFCh), and the newly assigned destination Fibre Channel address identifier to the Fibre Channel Device N_Port1, symbolically VN1FCID. FIA 1 951 receives the LS_ACC FCoE frame, decapsulates the frame (i.e., removes the layer 2 and FCoE frame headers) into a Fibre Channel frame and transmits the Fibre Channel frame 961 to Fibre Channel Device 1 950. The diagram also shows the communication between two Fibre Channel Devices 950 954 over an Ethernet network 964 966 969 967. This allows interconnection of Fibre Channel devices without the need to deploy a Fibre Channel network FIA to FIA network, thereby saving the user front purchasing and deploying two different types of FIA's or Fibre Channel switches and Ethernet switches. Fibre Channel Device 1 N_Port 1 950 transmits a Fibre Channel PLOGI request frame 964, addressed to Fibre Channel Device 2 N_Port2 954, symbolically NP2FCID. FIA 1 951 receives the Fibre Channel PLOGI frame, encapsulates the frame into a FCoE PLOGI frame 965 comprising a source Ethernet MAC address of Fibre Channel Device 1 N_Port1 950, symbolically NP1MAC, and a destination Ethernet MAC address of Fibre Channel Device 2 N_Port2 954, symbolically NP2MAC. FIA 1 951 then forwards the frame 965 to FIA 2 953. FIA 2 953 receives the frame, encapsulates the frame (i.e., removes the layer 2 Ethernet and FCoE frame headers) into a Fibre Channel frame and transmits the resulting frame 966 to Fibre Channel Device 2 N__Port2 954, Fibre Channel Device 2 N_Port2 954 the processes the frame 971 and may transmit a Fibre Channel LS_ACC response frame 969 to the Fibre Channel PLOGI frame. FIA 2 953 receives the frame, encapsulates the frame into a FCoE frame (i.e., adds the Ethernet and FCoE headers) comprising a source Ethernet MAC address of Fibre Channel Device 2 N_Port2 954, symbolically NP2MAC, a destination Ethernet MAC address of Fibre Channel Device 1 N_Port1 950, symbolically NP1MAC. FIA 2 953 transmits the frame 968 to FIA 1 951. FIA 1 951 decapsulates (i.e., removes the layer 2 Ethernet and FCoE frame headers) the FCoE frame into a Fibre Channel frame and transmits the Fibre Channel frame 967 to Fibre Channel Device 1 N_Port1 950. Transporting Fibre Channel frames over an Ethernet network will allow the deployment of Fibre Channel devices without deploying a separate Fibre Channel switched network, i.e., a network with Fibre Channel protocol interswitch links. The FIAs are adapted to encapsulate and decapsulate Fibre Channel frames into and from FCoE frames.

Figure 26:
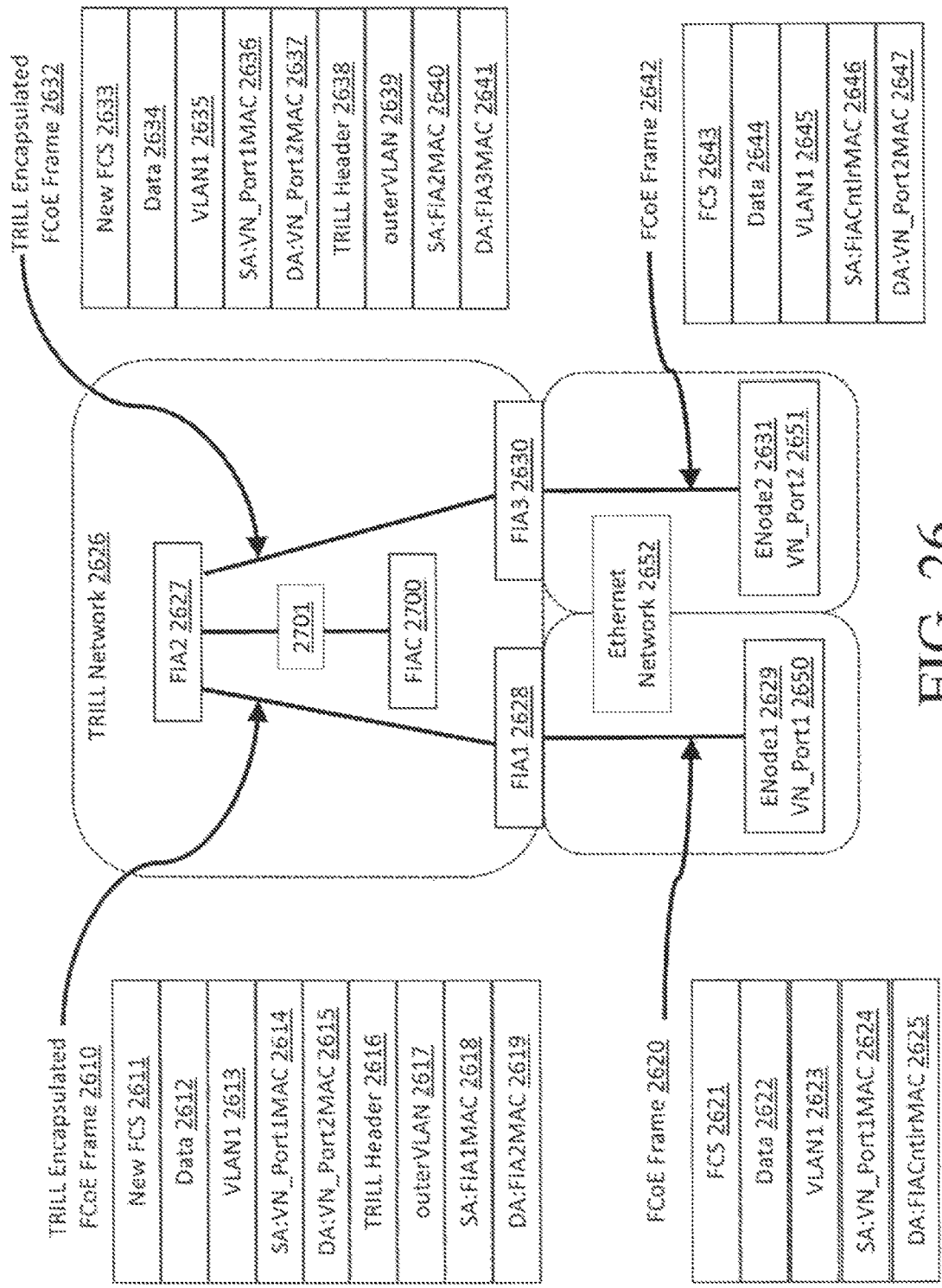
FIG. 26 is a diagram showing an FCoE frame sent from an Ethernet connected ENode through a network of FIAs to a destination Ethernet connected ENode over a TRILL Ethernet network.

FIG. 26 is a diagram showing a FCoE frame 2620 sent from an Ethernet connected ENode 2629 through a network of RBridge FIAs 2628 2627 2630 to a destination Ethernet connected ENode 2631 over a TRILL Ethernet network 2626. FIA1 2628, FIA2 2627, and FIA3 2630 form an Ethernet TRILL network 2626. The links from FIA1 2628 to ENode1 2629 and from FIA3 2630 to ENode2 2631 are Ethernet links 2652. The FIAC 2700 is coupled to 2701 FIA2 2627. The FIAC 2700 may be located anywhere in the network where it can communicate with all FIAs 2626 2628 2630 and ENodes 2629 2631. The FCoE frame transmitted 2620 from VN_Port1 2650 in ENode1 2629 includes the following values: Ethernet destination MAC address of the FIA Controller 2700 FCF_MAC address, symbolically FIACntlrMAC, Ethernet source MAC address of VN_Port1 2650, symbolically VN_Port1MAC, a Vlan identifier 2623, symbolically VLAN1, data 2622, and an FCS 2621. FIA1 2628 substitutes the destination MAC address with VN_Port2's 2651 MAC address, symbolically VN_Port2MAC. FIA1 2628 encapsulates the frame in a TRILL frame. The outer destination Ethernet MAC 2619 address contains the value of the next hop FIA MAC address, in this case the symbolic MAC address FIA2MAC 2619. The outer source Ethernet MAC address 2618 contains the value of the current FIA MAC address, in this case the symbolic MAC address FIA1MAC. The frame is received by FIA2 2627 and the outer destination Ethernet MAC address 2641 is changed to be the next hop, in this case FIA3 2630 and its symbolic Ethernet MAC address FIA3MAC 2641. The outer source Ethernet MAC address 2640 is changed to be FIA2's MAC address, in this case FIA2MAC 2640. The frame 2632 is then received by FIA3 2630, the TRILL header is removed and the source MAC address is changed to the FIAC 2700 MAC, symbolically FIACntlrMAC 2646, and the frame 2642 is forwarded to VN_Port2 2651 in ENode2 2631.

Figure 27:
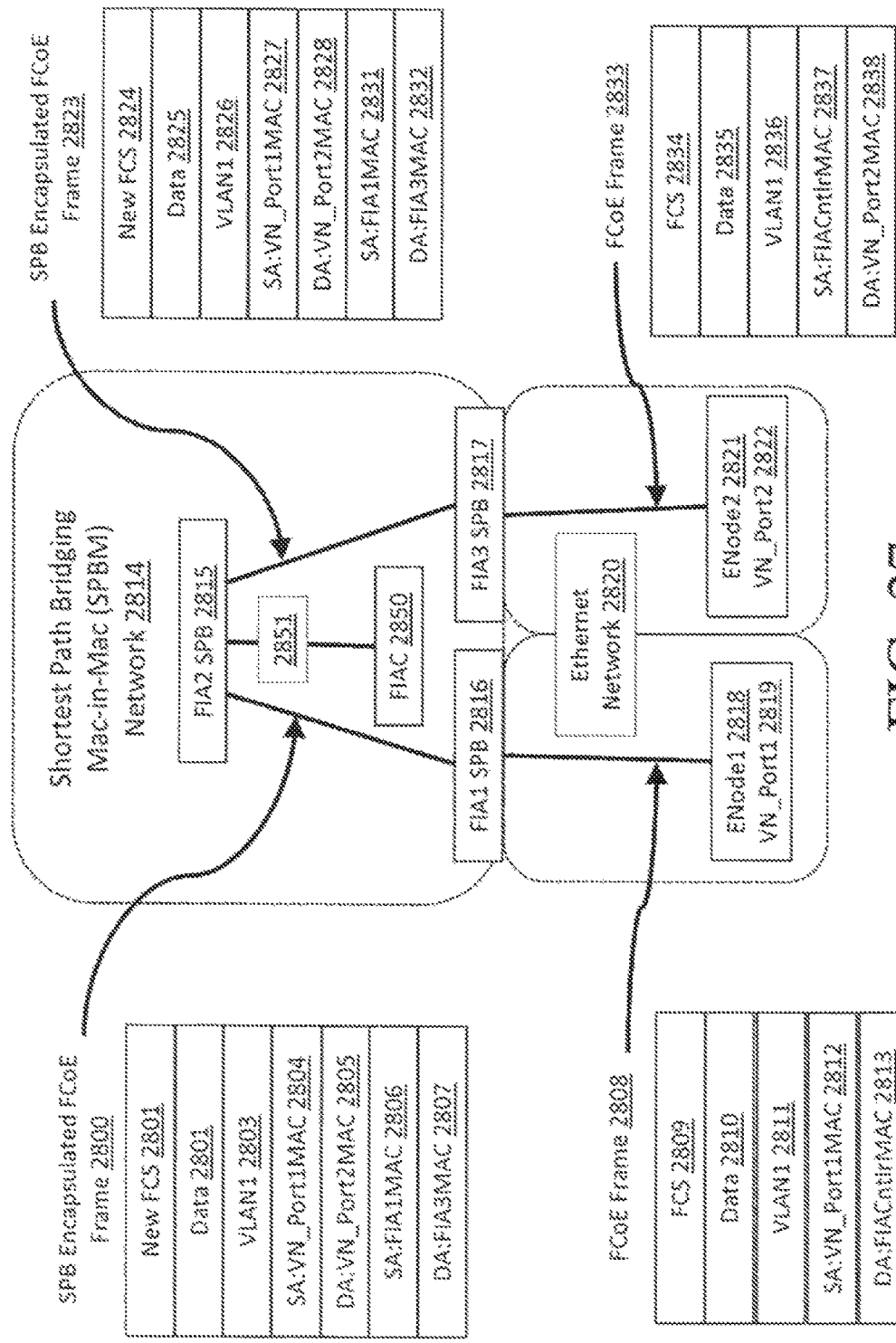
FIG. 27 is a diagram showing the interconnection of ENodes through a Shortest Path Bridging MAC-in-MAC (SPBM) network.

Shortest Path Bridging (SPB) is an IEEE draft (802.1aq). There are two SPB models for multipath bridging: Shortest Path Bridging VLAN (SPBV) and Shortest Path Bridging MAC-in-MAC (SPBM). FIG. 27 is a diagram showing the interconnection of ENodes 2818 2821 through a Shortest Path Bridging MAC-in-MAC (SPBM) network 2814. An FCoE frame 2808 sent from an Ethernet connected ENode 2818 through a network of FIAs 2816 2815 2817 adapted to implement Shortest Path Bridging to a destination Ethernet connected ENode 2821 over a SPBM network 2814. FIA1 2816, FIA2 2815, and FIA3 2817 form a SPBM 2814. The links from FIA1 2816 to ENode1 2818 and from FIA3 2817 to ENode2 2821 are Ethernet links 2820. An FIAC 2850 is coupled to the SPBM network 2814 through the link 2851. The FIAC 2850 may be located anywhere in the network as long as it can access both the FIAs 2815 2816 2817 to set and remove FMEs and access the ENodes 2818 2821 to perform the FIP protocol and provide essential Fabric Services through FCoE frames. The FCoE frame transmitted 2808 from VN_Port1 2819 in ENode1 2818 includes the following values: Ethernet destination FCF-MAC address 2813 of the FIAC 2850, symbolically FIACntlrMAC 2813, Ethernet source MAC address 2812 of VN_Port 1, symbolically VN_Port1MAC, a Vlan identifier 2811, symbolically VLAN1, data 2810, and an FCS 2809. FIA1 2816 substitutes the destination MAC address with VN_Port2's 2822 MAC address 2805, symbolically VN_Port2MAC, and substitutes the source MAC address 2804 with VN Port1's 2819 MAC address, symbolically VN_Port1MAC. The FIA1 2816 encapsulates the frame in a SPBM frame, i.e., adds a MAC-in-MAC header and other SPB fields. The outer destination Ethernet MAC 2619 address contains the value of the egress FIA MAC address, in this case the symbolic MAC address FIA3MAC 2817. The outer source Ethernet MAC address 2806 contains the value of the current FIA MAC address, in this case the symbolic MAC address FIA1MAC. The frame is received by FIA2 2815 and forwarded to the egress FIA, FIA3 2817. FIA3 2817 removes the outer MAC header, substitutes the source MAC address 2837 with the FIAC MAC address, symbolically FIACntlrMAC, and forwards the frame to VN_Port2 2822 in ENode2 2821. The Shortest Path Bridging network can be adapted to use Shortest Path Bridging VLAN (SPBV) in lieu of SPBM by using the Shortest Path VLAN ID (SPVID) to designate nodal reachability.

Figure 28:
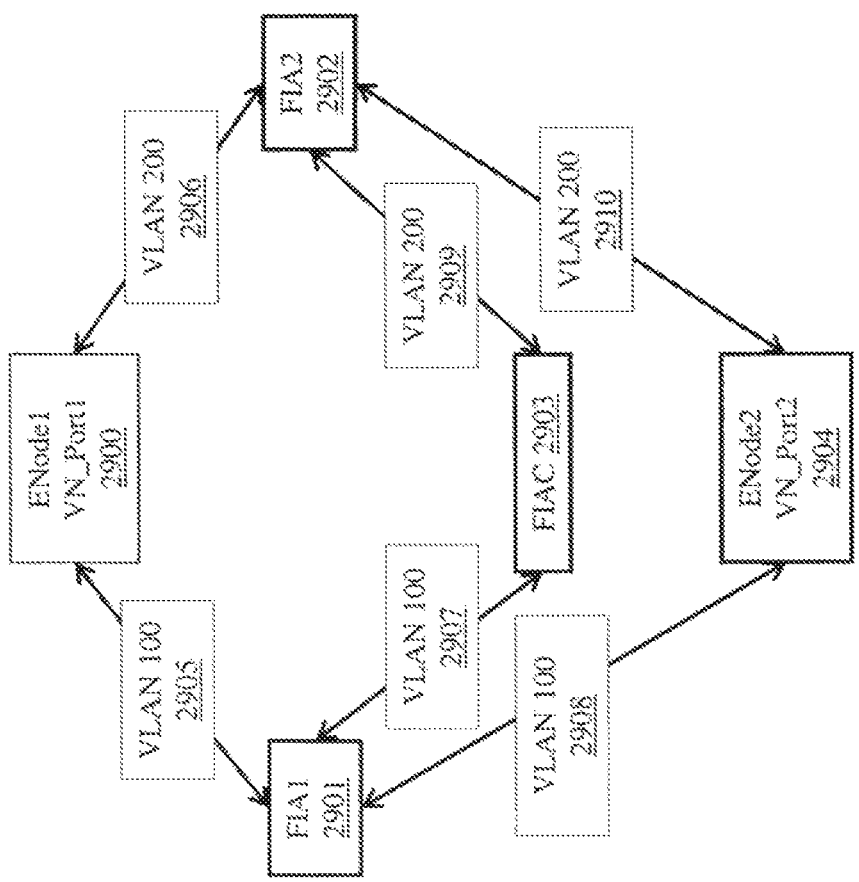
FIG. 28 shows a network comprising two ENodes, two FIAs and a FIAC.

FIG. 28 shows a network comprising two ENodes 2900 2904, two FIAs 2901 2902 and a FIAC 2903. FIA 1 2901 and FIA 2 2902 comprise dual Fabrics for redundant connections between ENodes, identified by two different Vlan identifiers, in this example Vlan 100 and Vlan 200. ENode 1 2900 is coupled to FIA 1 2901 through link 2905 and coupled to FIA2 2902 through link 2906. ENode 2 2904 is coupled to FIA 1 2901 through link 2908 and to FIA 2 2902 through link 2910. The FIAC 2903 is coupled to FIA 1 2901 through link 2907 and coupled to FIA2 2902 through link 2909. The FIAC and the ENodes which are coupled to the links 2905, 2908 and 2907 are adapted to use the Vlan identifier of 100. The FIAC and the ENodes which are coupled to the links 2906, 2909 and 2910 are adapted to use the Vlan identifier of 200.

Figure 29:
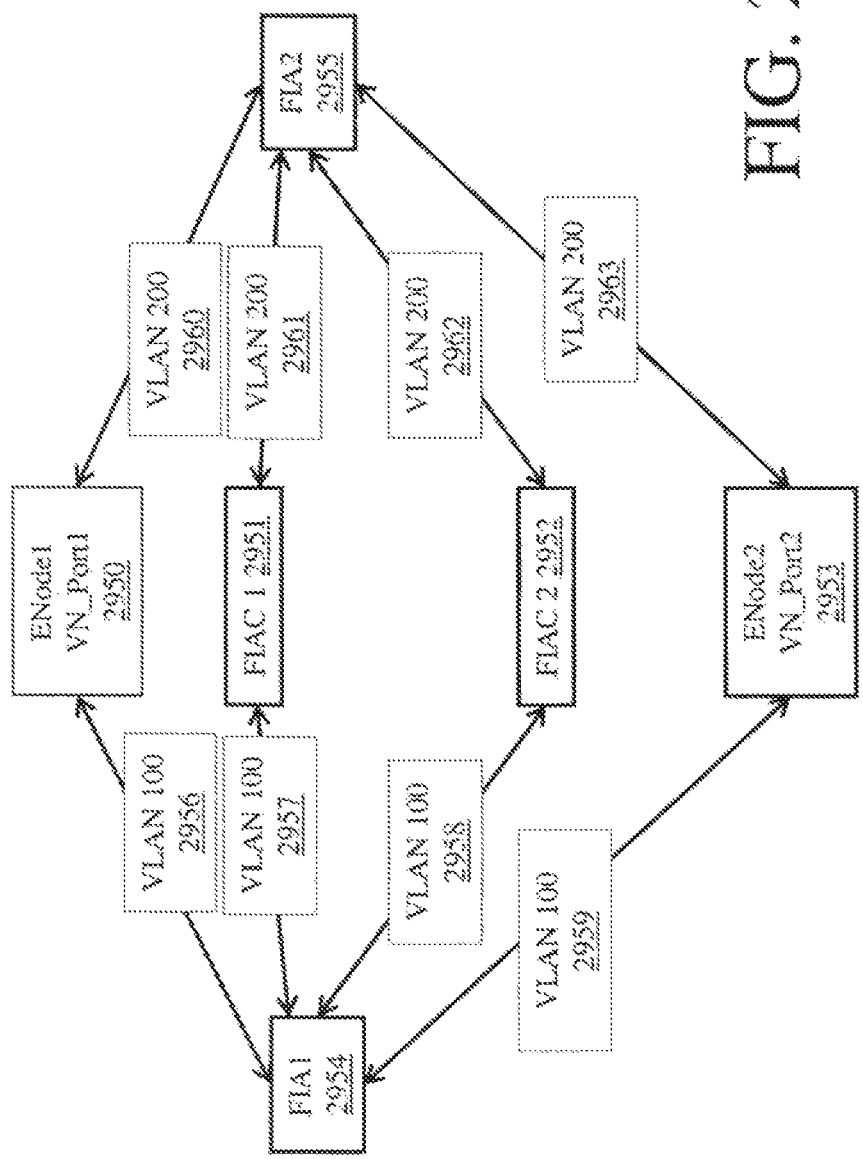
FIG. 29 shows a network comprising two ENodes, two FIAs and two FIACs.

FIG. 29 shows a network comprising two ENodes 2950, two FIAs 2954 2955 and two FIACs 2951 2952. FIA 1 2954 and FIA 2 2955 comprise dual Fabrics for redundant connections between ENodes, identified by two different Vlan identifiers. ENode 1 2950 is coupled to FIA 1 2954 through link 2956 and coupled to FIA2 2955 through link 2960. ENode 2 2953 is coupled to FIA 1 2954 through link 2959 and to FIA 2 2955 through link 2963. FIAC 1 2951 is coupled to FIA 1 2954 through link 2957 and coupled to FIA2 2955 through link 2961. FIAC 2 2952 is coupled to FIA 1 2954 through link 2958 and coupled to FIA 2 2955 through link 2962. FIAC 1 2951, FIAC 2 2952 and the ENodes 2950 2953 that are coupled to the links 2956, 2957, 2958 and 2959 are adapted to use the Vlan identifier of 100. FIAC 1 2951 and FIAC 2 2952 and the ENodes 2950 2953 that are coupled to the links 2960, 2961, 2962 and 2963 are adapted to use the Vlan identifier of 200. FIAC 2 2952 can operate either in a redundant mode, taking over control of the network in case FIAC 1 2951 fails or FIAC 2 2952 can control one of the Vlan networks, for example Vlan 200, while FIAC 1 2951 controls the other Vlan network, for example Vlan 100.

Figure 30:
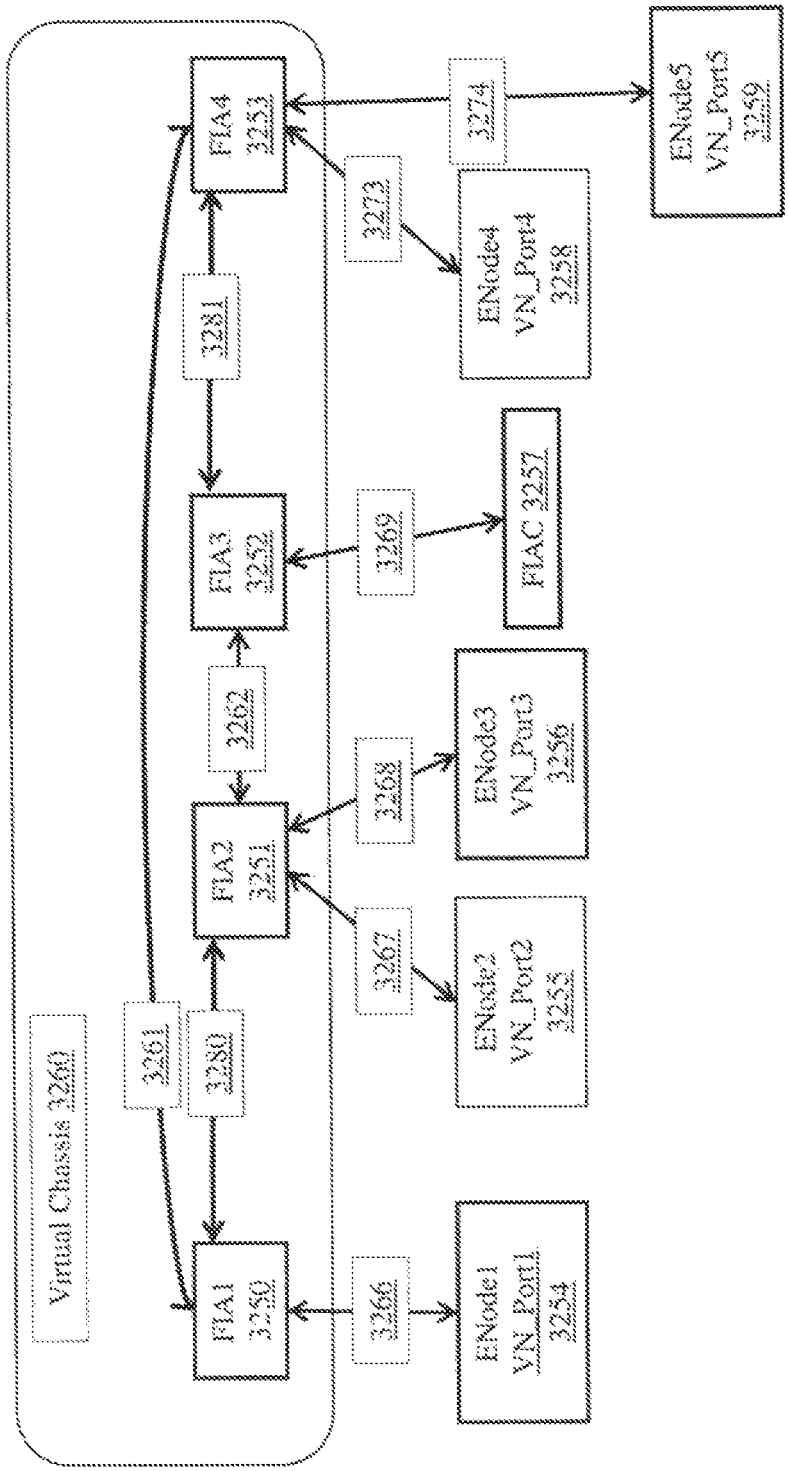
FIG. 30 shows a network comprising five ENodes, four FIAs and a FIAC. The four FIAs comprise a single virtual chassis.

FIG. 30 shows a network comprising five ENodes 3254 3255 3256 3258 3259, four FIAs 3250 3251 3252 3253 and a FIAC 3257. The four FIAs 3250 3251 3252 3253 comprise a single virtual chassis 3260. A virtual chassis 3260 comprised of multiple FIAs 3250 3251 3252 3253 is managed as if it was a single logical chassis. The multi-FIA virtual chassis 3260 acts like a single FIA. Each physical FIA in the fabric is managed as if it were a single FIA, responding to a single management address. This enables FIA scalability without manual configuration. The logical chassis capability significantly reduces management of physically different FIAs. ENode1 3254, ENode2 3255, ENode3 3256 ENode4 3258 ENode5 3259 are connected to the single virtual chassis through links 3266 3267 3268 3273 3274. FIAC 3257 connects to the virtual chassis through link 3269. The FIAC 3257 acts as the FCF in the FIP protocol to connected ENodes 3254 3255 3256 3258 3259 and provides essential Fabric Services comprising a zone server, name server, state change notification service among other services. The Virtual Chassis 3260 comprised of multiple FIAs 3250 3251 3252 3253 arc managed as a single FIA, i.e., the setting of FME's is done through a single management entity, such as a single SNMP IP address or Telnet/SSH address. The frame forwarding is performed by using the FIB tables in the FIA's forwarding over inter-FIA links 3261 3280 3262 3281. The inter-FIA links connect the FIA'a through internal to the virtual chassis paths.

Figure 31:
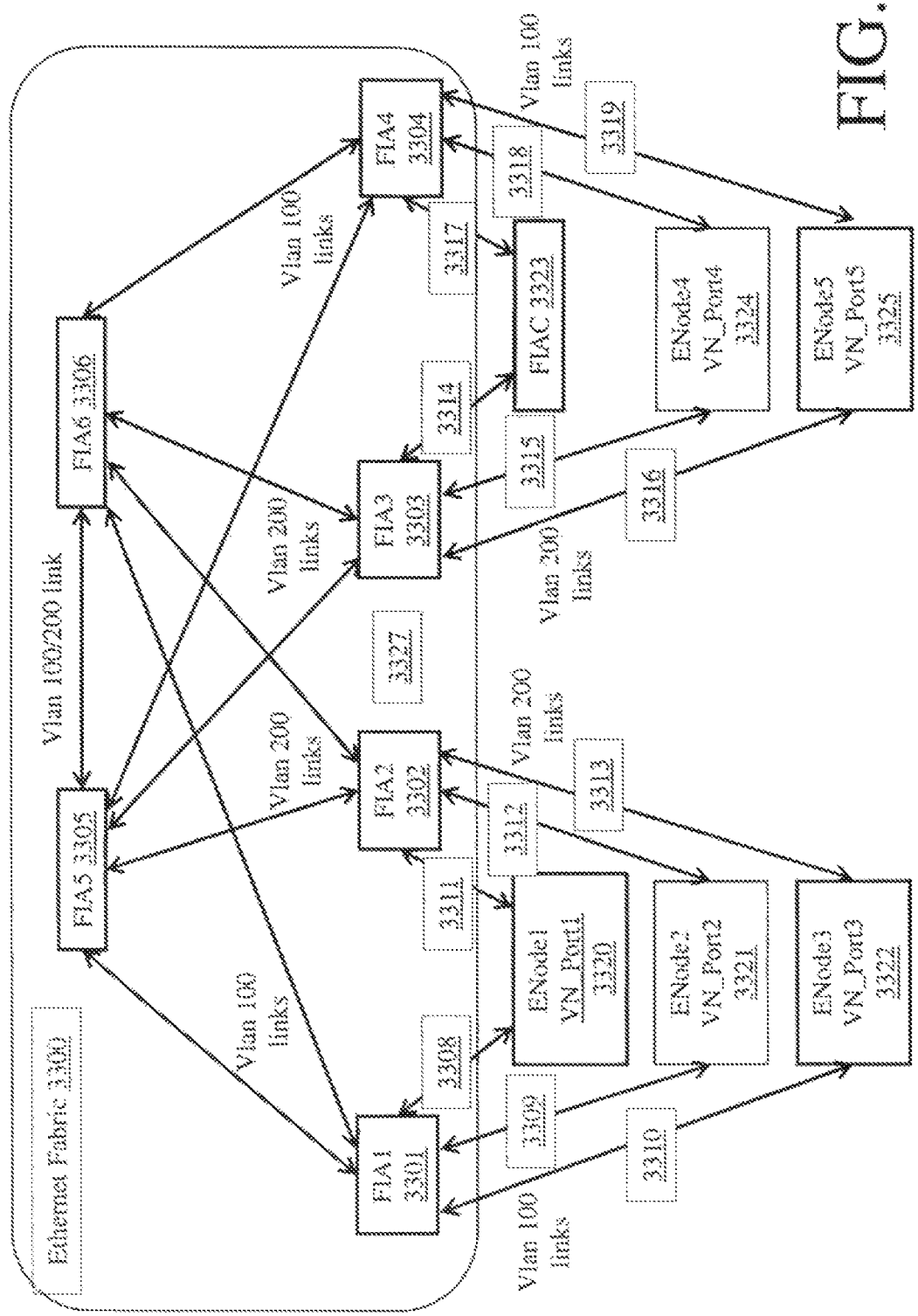
FIG. 31 shows a network comprising five ENodes, six FIAs and an FIAC. The FIAs form an access/core Ethernet networks.

FIG. 31 shows a network comprising five ENodes 3320 3321 3322 3324 3325, six FIAs 3301 3302 3303 3304 3305 3306 and an FIAC 3323. The FIAs form an access 3301 3302 3303 3304 and core 3305 3306 Ethernet network or alternatively a leaf 330 3302 3303 3304 and spline 3305 3306 network. The access FIAs 3301 3302 and 3303 3304 form two redundant access networks. The redundant networks are identified by the Vlan identifiers, 100 and 200. ENode1 3320, ENode2 3321 and ENode3 3322 connect to dual networks through FIA1 3301 and FIA2 3302. FIAC 3323, ENode4 3324 ENode5 3325 connect to dual networks through FIA3 3303 and FIA4 3304. The access FIAs 3301 3302 3303 3304 connect to the core FIAs 3305 3306 through redundant paths. FIAC 3323 connects to one of the two networks, identified by Vlan 100 through FIA3 3303 through link 3314. FIAC 3323 connects to the other of the two networks, identified by Vlan 200 through FIA4 3304 through link 3317. FIAC 3323 uses two FCF-MACs, one for each network identified by Vlan 100 and Vlan 200 to instantiate VN_Ports with connected ENodes 3320 3321 3322 3324. The network shown in FIG. 31 allows two paths of connection from each ENode to other ENodes and from the FIA to each ENode.

The foregoing systems, methods and apparatus may be widely applied to various applications. Without narrowing the generality of the foregoing, they may be fully applicable to Software Defined Storage Networks.

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

All publications and patents cited in this specification are herein incorporated by reference as if each individual publication or patent were specifically and individually indicated to be incorporated by reference in their entirety.

I claim:

1. A system for interconnection of one or more Fibre Channel over Ethernet (FCoE) devices, the system comprising:
   a virtual server, the virtual server comprising:
      a virtual machine comprising an FCoE device interconnection apparatus controller (FIAC), the FIAC comprising a database and an OpenFlow controller,
      a virtual switch, the virtual switch being coupled to the FCoE device interconnection apparatus controller, and
      a network interface, the network interface being coupled to the virtual switch,
   an Ethernet fabric,
   a first Ethernet link, the first Ethernet link coupling the network interface to the Ethernet fabric,
   a first Fibre Channel over Ethernet (FCoE) device,
   a second Ethernet link, the second Ethernet link coupling the first Fibre Channel over Ethernet device to the Ethernet fabric,
   a second Fibre Channel over Ethernet (FCoE) device, and
   a third Ethernet link, the third Ethernet link coupling the second Fibre Channel over Ethernet device to the Ethernet fabric.

2. The system of claim 1 wherein the Ethernet fabric is comprised of one or more Ethernet switches.

3. The system of claim 1 wherein the virtual server further includes
   a second virtual switch,
   a second network interface,
   a second Ethernet fabric,
   the FCoE device interconnection apparatus controller coupled to the said second virtual switch,
   a fourth Ethernet link, the fourth Ethernet link coupling the second network interface to the second Ethernet fabric,
   a fifth Ethernet link, the fifth Ethernet link coupling the first FCoE device to the second Ethernet fabric.

4. The system of claim 1 wherein the FIAC comprises storage, the storage containing one or more of the following Name Server objects from the first FCoE device: Port Identifier, Port Name, Node Name, Class of Service, FC-4 TYPE, Symbolic Port Name, Symbolic Node Name, Port Type, Fabric Port Name, Hard Address, FC-4 Features and Permanent Port Name.

5. The system of claim 1 wherein one or more of the FCoE devices is a storage array.

6. The system of claim 1 wherein one or more of the FCoE devices is a server.

7. The system of claim 1 wherein the virtualized server is embedded in a storage array.

8. A method for interconnection of one or more Fibre Channel over Ethernet (FCoE) devices comprising the steps of:
   a virtual server, the virtual server comprising:
   a virtual machine comprising an FCoE device interconnection apparatus controller (FIAC),
   a virtual switch, the virtual switch being coupled to the FCoE device interconnection apparatus controller, and
   a network interface, the network interface being coupled to the virtual switch,
   an Ethernet fabric,
   a first Ethernet link, the first Ethernet link coupling the network interface to the Ethernet fabric,
   a first Fibre Channel over Ethernet (FCoE) device,
   a second Ethernet link, the second Ethernet link coupling the first Fibre Channel over Ethernet device to the Ethernet fabric,
   a second Fibre Channel over Ethernet (FCoE) device, and
   a third Ethernet link, the third Ethernet link coupling the second Fibre Channel over Ethernet device to the Ethernet fabric;
   whereby the FIAC sends one or more of the following FCoE Initialization Protocol (FIP) frames to the attached FCoE devices: FIP Discovery Advertisement multicast, FIP Discovery Advertisement unicast, FIP VLAN response, FIP FCoE accept FLOGI LS_ACC to a FIP FLOGI Request frame.

9. The method in claim 8 wherein the first FCoE device receives the FIP Discovery Advertisement multicast frame from the FIAC, processes the frame, and then sends a FIP Discovery Solicitation response frame back to the FIAC.

10. The method in claim 8 wherein the first FCoE device transmits a FIP FLOGI Request frame to the FIAC, the FIAC receives the FIP FLOGI Request frame, the FIAC then responds with a FIP FLOGI LS_ACC frame.

11. The method in claim 8 wherein the FIAC comprises storage, the storage containing a Simple Name Server table, the said Simple name Server table comprising one or more of the following Name Server objects registered by the first FCoE device: Port Identifier, Port Name, Node Name, Class of Service, FC-4 TYPE, Symbolic Port Name, Symbolic Node Name, Port Type, Fabric Port Name, Hard Address, FC-4 Features and Permanent Port Name.

12. The method in claim 11 wherein the first FCoE device queries the Simple Name Server contained in the FIAC for other FCoE devices which support the FCP protocol.

13. A method for interconnection of one or more Fibre Channel over Ethernet (FCoE) devices under control of an FCoE virtual machine device interconnection apparatus controller (FIAC) coupled to an Ethernet fabric, comprising the steps of:
   multicasting a FIP Discovery Advertisement frame over the Ethernet fabric to the one or more FCoE devices,
   receiving the FIP Discovery Advertisement frame at the one or more FCoE devices,
   responding from one or more of the FCoE devices to tint FIAC virtual machine with a FIP Discovery Solicitation frame.

14. The method in claim 13 wherein the said FIAC virtual machine receives said FIP Discovery Solicitation frame, and responds with a FIP Discovery Advertisement unicast frame to a first FCoE device which sent the FIP Discovery Solicitation frame.

15. The method in claim 14 wherein the FCoE device receives the FIP Discovery Advertisement unicast frame from a first FCoE device, processes the frame, then sends a FIP FLOGI Request frame to the FIAC.

16. The method in claim 13 wherein the FIAC comprises storage, the storage containing a Simple Name Server table, the Simple Name Server table containing one or more of the following Name Server objects which were registered by the first FCoE device; Port Identifier, Port Name, Node Name, Class of Service, FC-4 TYPE, Symbolic Port Name, Symbolic Node Name, Port Type, Fabric Port Name, Hard Address, FC-4 Features and Permanent Port Name.

17. The method in claim 16 wherein a first FCoE device queries the Simple Name Server contained in the FIAC for other FCoE devices which support the FCP protocol.

18. The method in claim 13 wherein a first FCoE device sends a FCoE State Change Registration (SCR) Command to the FIAC, the FIAC receives the SCR Command, and responds with an FCoE PLOGI Accept command.

19. The method of claim 13 wherein the one or more first FCoE devices send a Simple Name Server Get Port Identifiers (GID_FF) request query to the FIAC, and the FIAC responds with a Simple Name Server Accept to the GID_FF frame, the Accept comprising the N_Port Identifier of a second FCoE device.

20. The method of claim 13 wherein the one or more first FCoE devices send a Simple Name Server Get Port Names Simplified Discovery for FCP (FPN_SDFCP) request query to the FIAC, and the FIAC responds with a Simple Name Server Accept to the GPN_SDFCP frame, the Accept comprising the N_Port Identifier and port name of a second FCoE device.

* * * * *